(12) United States Patent
Mizusaki et al.

(10) Patent No.: US 10,815,426 B2
(45) Date of Patent: Oct. 27, 2020

(54) LIQUID CRYSTAL CELL FOR SCANNING ANTENNA AND METHOD OF PRODUCING LIQUID CRYSTAL CELL FOR SCANNING ANTENNA

(71) Applicant: SHARP KABUSHIKI KAISHA, Sakai, Osaka (JP)

(72) Inventors: Masanobu Mizusaki, Sakai (JP); Kiyoshi Minoura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 55 days.

(21) Appl. No.: 16/326,181

(22) PCT Filed: Aug. 10, 2017

(86) PCT No.: PCT/JP2017/029044
§ 371 (c)(1),
(2) Date: Feb. 15, 2019

(87) PCT Pub. No.: WO2018/034223
PCT Pub. Date: Feb. 22, 2018

(65) Prior Publication Data
US 2019/0194541 A1  Jun. 27, 2019

(30) Foreign Application Priority Data
Aug. 17, 2016 (JP) .................... 2016-160007

(51) Int. Cl.
*C09K 19/18* (2006.01)
*H01Q 3/44* (2006.01)
*G02F 1/1339* (2006.01)
*H01Q 13/22* (2006.01)
*H01Q 3/34* (2006.01)
(Continued)

(52) U.S. Cl.
CPC ................. *C09K 19/18* (2013.01); *C09J 5/00* (2013.01); *C09J 181/02* (2013.01); *C09K 19/54* (2013.01);
(Continued)

(58) Field of Classification Search
CPC ........ C09K 19/18; C09K 19/54; C09K 19/56; C09K 2219/11; G02F 1/1339; G02F 1/13;
(Continued)

(56) References Cited

U.S. PATENT DOCUMENTS 8,330,157 B2 * 12/2012 Fujii ................... H01L 51/0022
257/43
2005/0158665 A1 * 7/2005 Maekawa ........... H01L 27/1292
430/313
(Continued)

FOREIGN PATENT DOCUMENTS

JP  2009-538565 A  11/2009
JP  2013-539949 A  10/2013
JP  2016-512408 A  4/2016

*Primary Examiner* — Raymond R Chai
(74) *Attorney, Agent, or Firm* — ScienBiziP, P.C.

(57) ABSTRACT

A liquid crystal cell according to the present invention includes a TFT board including a first dielectric substrate, TFTs supported by the first dielectric substrate, and patch electrodes, a slot board including a second dielectric substrate and a slot electrode having slots and supported by the second dielectric substrate, and a liquid crystal layer between the TFT board and the slot board, which are positioned with the patch electrodes and the slot electrode facing each other, and a sealant disposed between the TFT board and the slot board and surrounding the liquid crystal layer. The liquid crystal layer includes a liquid crystal compound containing an isothiocyanate group. The sealant includes an ene-thiol compound in which an ene compound and a thiol compound are bonded by using a radical.

15 Claims, 10 Drawing Sheets

(51) Int. Cl.
*G02F 1/13* (2006.01)
*G02F 1/1368* (2006.01)
*C09K 19/54* (2006.01)
*C09J 5/00* (2006.01)
*C09J 181/02* (2006.01)
*C09K 19/56* (2006.01)
*C09K 19/04* (2006.01)

(52) U.S. Cl.
CPC ............ *C09K 19/56* (2013.01); *G02F 1/13* (2013.01); *G02F 1/1339* (2013.01); *G02F 1/1368* (2013.01); *H01Q 3/34* (2013.01); *H01Q 3/44* (2013.01); *H01Q 13/22* (2013.01); *C09J 2301/416* (2020.08); *C09J 2481/00* (2013.01); *C09K 2019/0448* (2013.01); *C09K 2019/181* (2013.01); *C09K 2219/11* (2013.01)

(58) Field of Classification Search
CPC ........ G02F 1/1368; G02F 1/29; G02F 1/1341; G02F 2001/134318; H01Q 13/22; H01Q 3/34; H01Q 3/44; H01Q 21/0012; C09J 5/00; C09J 181/02; C09J 2205/31; C09J 2481/00; G09K 2019/0488; G09K 2019/181
See application file for complete search history.

(56) References Cited

U.S. PATENT DOCUMENTS

| | | |
|---|---|---|
| 2007/0258033 A1* | 11/2007 | Ochi .................. G02F 1/1339 349/153 |
| 2007/0273599 A1 | 11/2007 | Haziza |
| 2008/0036664 A1* | 2/2008 | Haziza ................ H01Q 9/0442 343/700 MS |
| 2008/0048922 A1 | 2/2008 | Haziza |
| 2008/0111755 A1 | 5/2008 | Haziza |
| 2008/0117113 A1 | 5/2008 | Haziza |
| 2008/0117114 A1 | 5/2008 | Haziza |
| 2008/0316142 A1 | 12/2008 | Haziza |
| 2009/0091500 A1 | 4/2009 | Haziza |
| 2012/0194399 A1* | 8/2012 | Bily .................... H01Q 15/0006 343/772 |
| 2014/0266946 A1 | 9/2014 | Bily et al. |
| 2015/0229028 A1 | 8/2015 | Bily et al. |
| 2015/0236412 A1* | 8/2015 | Bily .................... H01Q 21/0012 342/374 |
| 2016/0359234 A1 | 12/2016 | Bily et al. |
| 2016/0372834 A1 | 12/2016 | Bily et al. |
| 2017/0130129 A1* | 5/2017 | Wittek ................... C09K 19/10 |
| 2018/0076521 A1* | 3/2018 | Mehdipour ........ H01Q 21/0056 |

* cited by examiner

LIQUID CRYSTAL CELL FOR SCANNING ANTENNA AND METHOD OF PRODUCING LIQUID CRYSTAL CELL FOR SCANNING ANTENNA

TECHNICAL FIELD

The present invention relates to a liquid crystal cell for a scanning antenna and a method of producing a liquid crystal cell for a scanning antenna.

BACKGROUND ART

Antennas used for mobile communication and satellite broadcasting, for example, are required to have a beam-steerable beam scanning function. An example of the antenna having such a function is a scanning antenna that uses high dielectric anisotropy (birefringence) of liquid crystals (including nematic liquid crystals and polymer-dispersed liquid crystals) (for example, Patent Documents 1 to 3). This type of scanning antenna includes two boards having electrodes and a liquid crystal layer sandwiched therebetween a liquid crystal cell for a scanning antenna).

RELATED ART DOCUMENT

Patent Document

Patent Document Japanese Unexamined Patent Application Publication (Translation of PCI Application) No. 2013-539949
Patent Document 2: Japanese Unexamined Patent Application Publication (Translation of PCT Application) No. 2016-512408
Patent Document 3: Japanese Unexamined Patent Application Publication (Translation of PCT Application) No. 2009-538565

DISCLOSURE OF THE PRESENT INVENTION

Problem to be Solved by the Invention

The scanning antenna needs a liquid crystal compound having a sufficient dielectric anisotropy ($\Delta\varepsilon$) level in a GHz band. Thus, a liquid crystal compound containing an isothiocyanate group, which has high dielectric anisotropy, is practically inevitably used as the liquid crystal compound for a scanning antenna.

However, the liquid crystal compound containing an isothiocyanate group is susceptible ultraviolet (such as ultraviolet light and visible light) and is readily oxidizable, possibly resulting in a large decrease in a voltage holding ratio (VHR) of the liquid crystal cell between the boards. The decrease in voltage holding ratio may cause a malfunction of the scanning antenna.

The following explains how impurities responsible for a decrease in voltage holding ratio are generated from the liquid crystal compound containing an isothiocyanate group in the liquid crystal cell with reference to FIG. 1. FIG. 1 is an explanatory view indicating how an impurity having a stable radical is generated from the liquid crystal compound containing an isothiocyanate group. As indicated in FIG. 1, the liquid crystal compound containing an isothiocyanate group represented by a chemical formula (a-1) has a structure ($—C_6H_4—N=C=S$) in which an isothiocyanate group is bonded to a phenylene group. The isothiocyanate group readily reacts with outside moisture ($H_2O$) entered the liquid crystal cell and with a nearby functional group (such as a carboxyl group and a hydroxyl group) containing active hydrogen. As a result of the reaction, a compound having a thiourethane bond and a compound having a different bond ($—C_6H_4—NH—CS—O—$) represented by a chemical formula (a-2), for example, are generated from the liquid crystal compound containing an isothiocyanate group. The bonds are readily subjected to cleavage (photocleavage) upon application of light, generating two compounds each including a radical as represented by chemical formulas (a-3) and (a-4).

The compound represented by the chemical formula (a-3) particularly readily reacts with oxygen. Oxidization of the chemical formula (a-3) generates a compound containing a highly active stable radical (compound represented by a chemical formula (a-5)). The radical is unlikely to disappear in the liquid crystal layer, and thus an ion component is more likely generated in the liquid crystal layer due to the presence of the radical. This may decrease the voltage holding ratio of the liquid crystal cell.

The liquid crystal compound compound containing an isothiocyanate group typically includes a row of phenylene groups. Light absorption is more likely to occur in a long-wavelength range (light of 350 nm or more or 400 nm or more) as the number of phenylene groups increases. Furthermore, if there is a tolan group between the phenylene groups, light absorption is likely to occur in a longer-wavelength range (light of 400 nm or more, or 420 nm or more), allowing the above-described radical generation by photocleavage of the thiourethane bond, for example, and the oxidation reaction with respect to the generated radical to readily occur.

An object of the present invention is to provide a liquid crystal cell for a scanning antenna that includes a liquid crystal layer including a liquid crystal compound containing an isothiocyanate group and that has a lower probability of decrease in voltage holding ratio.

DISCLOSURE OF THE PRESENT INVENTION

Means for Solving the Problem

A liquid crystal cell for a scanning antenna according to the present invention includes a TFT board including a first dielectric substrate, TFTs supported by the first dielectric substrate, and patch electrodes electrically connected to the TFTs, a slot board including a second dielectric substrate and a slot electrode having slots and supported by the second dielectric substrate, a liquid crystal layer between the TFT board and the slot board, and a sealant disposed between the TFT board and the slot board and surrounding the liquid crystal layer. The TFT board and the slot board are positioned with the patch electrodes and the slot electrode facing each other in such a manner that the patch electrodes are located relative to the corresponding slots. The liquid crystal layer includes a liquid crystal compound containing an isothiocyanate group. The sealant includes an ene-thiol compound in which an ene compound and a thiol compound are bonded by using a radical. Herein, a compound in which an ene compound and a thiol compound are bonded to each other by using a radical is referred to as an ene-thiol compound.

In the liquid crystal cell for a scanning antenna, the liquid crystal compound containing an isothiocyanate group has a structure represented by any one of the following chemical formulas (5-1) and (5-2).

In the liquid crystal cell for a scanning antenna, the thiol compound preferably has two or more thiol groups in one molecule.

In the liquid crystal cell for a scanning antenna, the ene compound preferably has two or more carbon-carbon double bonds in one molecule.

In the liquid crystal cell for a scanning antenna, the sealant preferably includes a sealant body that surrounds the liquid crystal layer between the TFT board and the slot board and includes an inlet portion having a hole through which the liquid crystal layer and an outside are in communication with each other and a sealing portion that seals the hole in the inlet portion. The sealant body and/or the sealing portion preferably includes the ene-thiol compound.

In the liquid crystal cell for a scanning antenna, the TFT board and/or the slot board preferably includes an alignment film formed of a poly aide resin at a side adjacent to the liquid crystal layer.

A method of producing a liquid crystal cell for a scanning antenna according to the present invention includes applying a photocurable and/or thermosetting ODF sealant composition including an ene compound, a thiol compound, and a radical polymerization initiator in a frame-like shape onto one of a TFT board and a slot board, applying a liquid crystal material including a liquid crystal compound containing an isothiocyanate group onto the one of the TFT board and the slot board by an ODF method on an inner side of the frame-like shaped ODF sealant composition, allowing the ODF sealant composition on the one of the TFT board and the slot board to be subjected to precuring, attaching the TFT board and the slot board to each other with the ODF sealant composition therebetween, and allowing the ODF sealant composition to be subjected to final curing. The TFT board includes a first dielectric substrate, TFTs supported by the first dielectric substrate, and patch electrodes electrically connected to the TFTs. The slot board includes a second dielectric substrate and a slot electrode having slots and supported by the second dielectric substrate.

Another method of producing a liquid crystal cell for a scanning antenna according to the present invention includes applying a photocurable and/or thermosetting sealant composition in a frame-like shape with a cutout onto one of TFT board and a slot board, allowing the sealant composition on the one of the TFT board and the slot board to be subjected to precuring, attaching the TFT board and the slot board to each other with the sealant composition therebetween, allowing the sealant composition to be subjected to final curing, injecting a liquid crystal material including a liquid crystal compound containing an isothiocyanate group by a vacuum impregnation on method through an inlet portion including the cutout in the final cured sealant composition, applying a photocurable and/or thermosetting sealing material composition including an ene compound, a thiol compound, and a radical polymerization initiator to close the inlet portion, and curing the sealing material composition to form a sealing portion. The TFT board includes a first dielectric substrate, TFTs supported by the first dielectric substrate, and patch electrodes electrically connected to the TFTs. The slot board includes a second dielectric substrate and a slot electrode having slots and supported by the second dielectric substrate.

In the method of producing liquid crystal cell for a scanning antenna, the radical polymerization initiator is preferably one of a photo-radical polymerization initiator that generates radicals by using light and a thermal-radical polymerization initiator that generates radicals by using heat.

In the method of producing a liquid crystal cell for a scanning antenna, the radical polymerization initiator may include a compound having a benzyl group or a thioxanthone group.

In the method of producing a liquid crystal cell for a scanning antenna, the radical polymerization initiator may include an azo compound.

In the method of producing a liquid crystal cell for a scanning antenna, the radical polymerization initiator may include an organic peroxide.

In the method of producing a liquid crystal cell for a scanning antenna, the thiol compound preferably has two or more thiol groups in one molecule.

In the method of producing a liquid crystal cell for a scanning antenna, the ene compound preferably has two or more carbon-carbon double bonds in one molecule.

In the method of producing a liquid crystal cell for a scanning antenna, the TFT board and/or the slot board preferably includes an alignment film formed of a polyimide resin on a side adjacent to the liquid crystal layer.

Advantageous Effect of the Invention

The present invention provides a liquid crystal cell for a scanning antenna, for example, that includes a liquid crystal layer including a liquid crystal compound containing an isothiocyanate group and that has a lower probability of decrease in voltage holding ratio.

MODE FOR CARRYING OUT THE INVENTION

First Embodiment (Basic Structure of Scanning Antenna)

A scanning antenna has a beam-steerable beam scanning function and includes multiple antenna units that use high anisotropy of a dielectric constant M (εM) (birefringence index) of a liquid crystal material. In the scanning antenna, a voltage applied to the liquid crystal layer of each antenna unit is controlled to change the effective dielectric constant M (εM) of the liquid crystal layer of each antenna unit such that a two-dimensional pattern is formed by the antenna units having different capacities. The dielectric constant of the liquid crystal material has frequency dispersion, and the dielectric constant for microwave frequency bands is particularly denoted as a "dielectric constant M (εM)" in this specification.

Electromagnetic waves (for example, microwaves) emitted from or received by a scanning antenna have different phases corresponding to the capacitances of the antenna units and gain a strong directivity in a particular direction corresponding to the two-dimensional pattern formed by the antenna units having different capacitances (beam scanning). For example, an electromagnetic wave emitted from a scanning antenna is obtained by integrating spherical waves that are obtained through scattering of electromagnetic waves inputted into the antenna units, in consideration of the phase difference provided by the antenna units.

Figure 2:
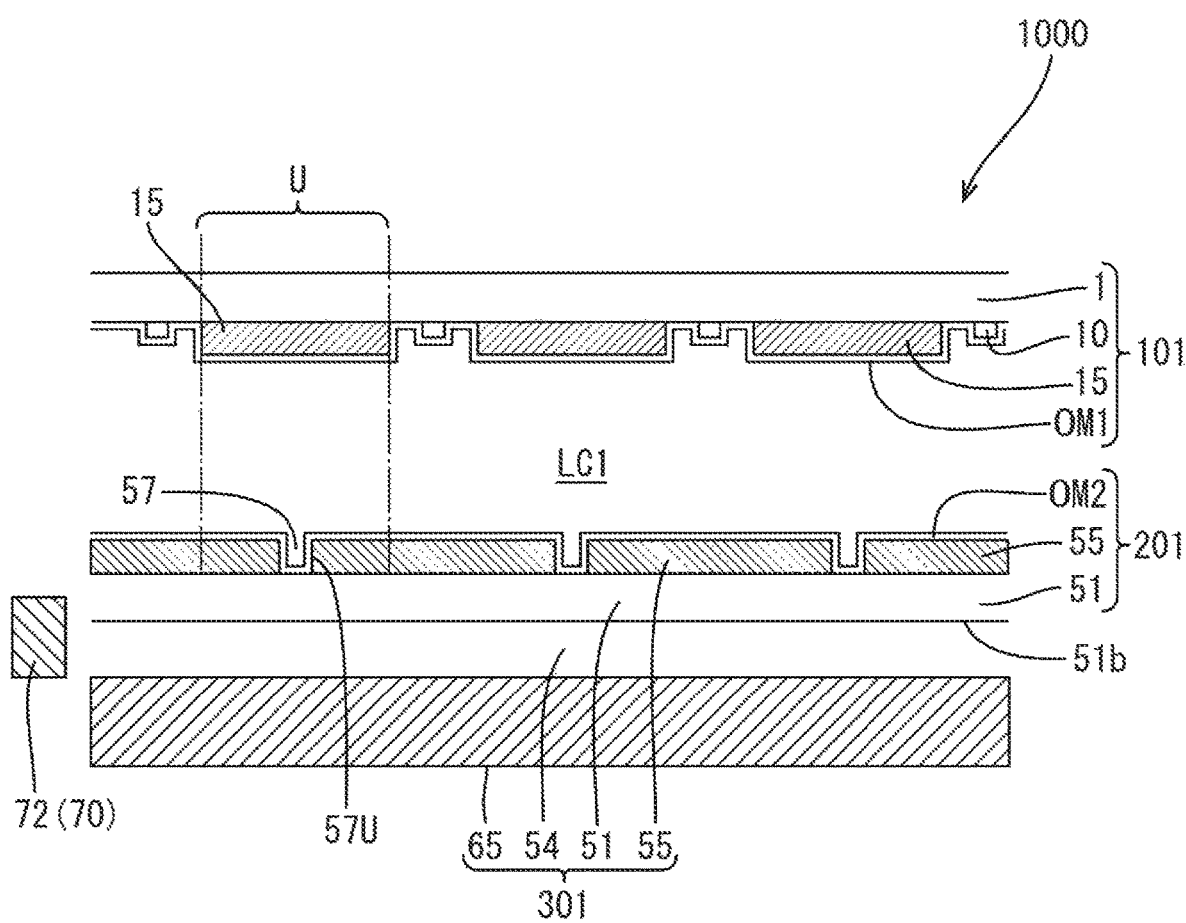
FIG. 2 is a cross-sectional view schematically illustrating a portion of a scanning antenna according to a first embodiment.

The basic structure of the scanning antenna according to an embodiment of the invention is described with reference to FIG. 2, example. FIG. 2 is a cross-sectional view schematically illustrating a portion of a scanning antenna 1000 according to a first embodiment. The scanning antenna 1000 according to the embodiment is a radial in-line slot antenna in which slots 57 are concentrically arranged. FIG. 2 schematically illustrates a portion of the scanning antenna 1000 in cross-section taken in the radial direction from a power feed pin 72 disposed near the center of the concentrically arranged slots. In some embodiments, the arrangement of the slots may be any of known arrangements (a spiral shape or a matrix, for example).

The scanning antenna 1000 mainly includes a TFT board 101, a slot board 201, a liquid crystal layer LC1 between the boards 101 and 201, and a reflective conductive plate 65. The scanning antenna 1000 transmits and receives microwaves at a side of the TFT board 101. The TFT board 101 and the slot board 201 face each other with the liquid crystal layer LC1 therebetween.

The TFT board 101 includes a dielectric substrate (one example of a first dielectric substrate) 1 such as a glass substrate, multiple patch electrodes 15 and multiple TFTs (thin film transistors) 10 that are disposed on a surface of the dielectric substrate 1 adjacent to the liquid crystal layer LC1, and an alignment film OM1 closest to the liquid crystal layer LC1. The TFTs 10 are connected to gate bus lines and source bus lines, which are not illustrated in FIG. 2.

The slot board 201 includes a dielectric substrate (one example of a second dielectric substrate) 51 such as a glass substrate, a slot electrode 55 on a surface of the dielectric substrate 51 adjacent to the liquid crystal layer LC1, and an alignment film OM2 closest to the liquid crystal layer LC1. The slot electrode 55 has multiple slots 57.

The dielectric substrates 1 and 51, which are included in the TFT board 101 and the slot board 201, preferably have small dielectric losses with respect to the microwaves and may be plastic substrates instead of the glass substrates.

Although the dielectric substrates 1 and 51 may have any thickness, the thickness is preferably 400 μm or smaller and more preferably 300 μm or smaller. The dielectric substrates 1 and 51 have no lower thickness limit and may have any thickness that provides enough strength undergo the production process, for example.

The reflective conductive plate 60 faces the slot board 201 with an air layer 54 therebetween. In some embodiments, a layer formed of a dielectric (for example, a fluorine resin such as PTFE) having a small dielectric constant M with respect to microwaves may be used instead of the air layer 54. In the scanning antenna 1000 of the embodiment, the slot electrode 55, the reflective conductive plate 65, and the dielectric substrate 51 and the air layer 54, which are located between the slot electrode 55 and the reflective plate 65, function as a waveguide 301.

The patch electrode 15, a portion of the slot electrode 55 including the slot 57 (hereinafter, may be referred to as a "slot electrode unit 57U"), and the liquid crystal layer LC1 therebetween form an antenna unit U. In each antenna unit U, one island-shaped patch electrode 15 faces one slot 57 in the form of a hole (slot electrode unit 57U) with the liquid crystal layer LC1 therebetween to form a liquid crystal capacitor. The scanning antenna 1000 according to the embodiment includes the concentrically arranged antenna units U. The antenna unit U has an auxiliary capacitor electrically connected in parallel to the liquid crystal capacitor.

The slot electrode 55, which forms the antenna units U at the slot electrode units 57U, and functions as a wall of the waveguide 301. The slot electrode 55 is required to reduce the transmission of microwaves and is formed of a relatively thick metal layer. Examples of the metal layer include a Cu layer and an Al layer. For example, a Cu layer having a thickness of 3.3 μm or larger or an Al layer having a thickness of 4.0 μm or larger is used to attenuate a microwave of 10 GHz to about 1/150. A Cu layer having a thickness of 1.9 μm or larger or an Al layer having a thickness of 2.3 μm or larger is used to attenuate a microwave of 30 GHz to about 1/150. Although there is no upper thickness limit for the metal layer that forms the slot electrode 55, the thinner the better in view of the formation of the alignment film OM2, which will be described later. The metal layer formed of Cu is able to be thinner than that formed of Al. The slot electrode 55 may be formed by a thin film deposition method used in a known liquid crystal display device technology or other methods such as a method of attaching a metal foil (such as Cu foil or Al foil) to the substrate. For example, the metal layer has a thickness of not less than 2 μm and not more than 30 μm. When a thin film deposition method is used to form the metal layer, the thickness of the metal layer is not more than 5 μm, for example. The reflective conductive plate 65 may be an aluminum plate or a copper plate that has a thickness of a few millimeters, for example.

The patch electrode 15, which does not form the waveguide 301 as the slot electrode 55 does, is formed of a metal layer having a smaller thickness than that of the slot electrode 55. The patch electrode 15 preferably has a low resistance in order to avoid that the oscillation energy of free electrons near the slot 57 of the slot electrode 55 is converted into heat when inducing the oscillation of free electrons in the patch electrode 15. From the viewpoint of mass production, an Al layer is more preferable than a Cu layer. The thickness of the Al layer is preferably not less than 0.5 μm and not more than 2 μm, for example.

As described in Patent Document 1, the arrangement pitch of the antenna units U is set to λ/4 or less and/or λ/5 or less in which λ is the wavelength of the microwave. The wavelength λ may be 25 mm. In such a case, the arrangement pitch is set to 6.25 mm or less and/or 5 mm or less, for example.

In the scanning antenna 1000, the phase of the microwave emitted (re-radiated) from each patch electrode 15 is changed by changing the capacitance of the liquid crystal capacitor of the antenna unit U. Thus, in the liquid crystal layer LC1, the anisotropy (ΔεM) of the dielectric constant M (cM) with respect to microwaves is preferably high, and tan δM (dielectric tangent with respect to microwaves) is preferably small. For example, a liquid crystal material having ΔεM of 4 or more and tan δM of 0.02 or less (both at 19 GHz) presented by M. Wittek et al., SID 2015 DIGEST pp. 824-826 is preferably used. Instead of this, a liquid crystal material having ΔεM of 0.4 or more and tan δM of 0.04 or less presented by Kuki, "KOBUNSHI (high Polymers)", vol. 55, August, pp. 599-602 (2006) may be used.

Although the dielectric constant of a liquid crystal material generally has frequency dispersion, the dielectric anisotropy ΔεM with respect to microwaves has a positive correlation with the refractive index anisotropy Δn with respect to visible light. Thus, a material having a high refractive index anisotropy Δn with respect to visible light is preferably employed as a liquid crystal material of an antenna unit used for microwaves. Here, a nematic liquid crystal having Δn of 0.3 or more, more preferably 0.4 or more is used in an antenna unit for microwaves, when Δn (birefringence) with respect to light of 550 nm is used as an index. There is no upper limit for Δn. The thickness of the liquid crystal layer LC1 is not less than 1 μm and not more than 500 μm.

Figure 3:
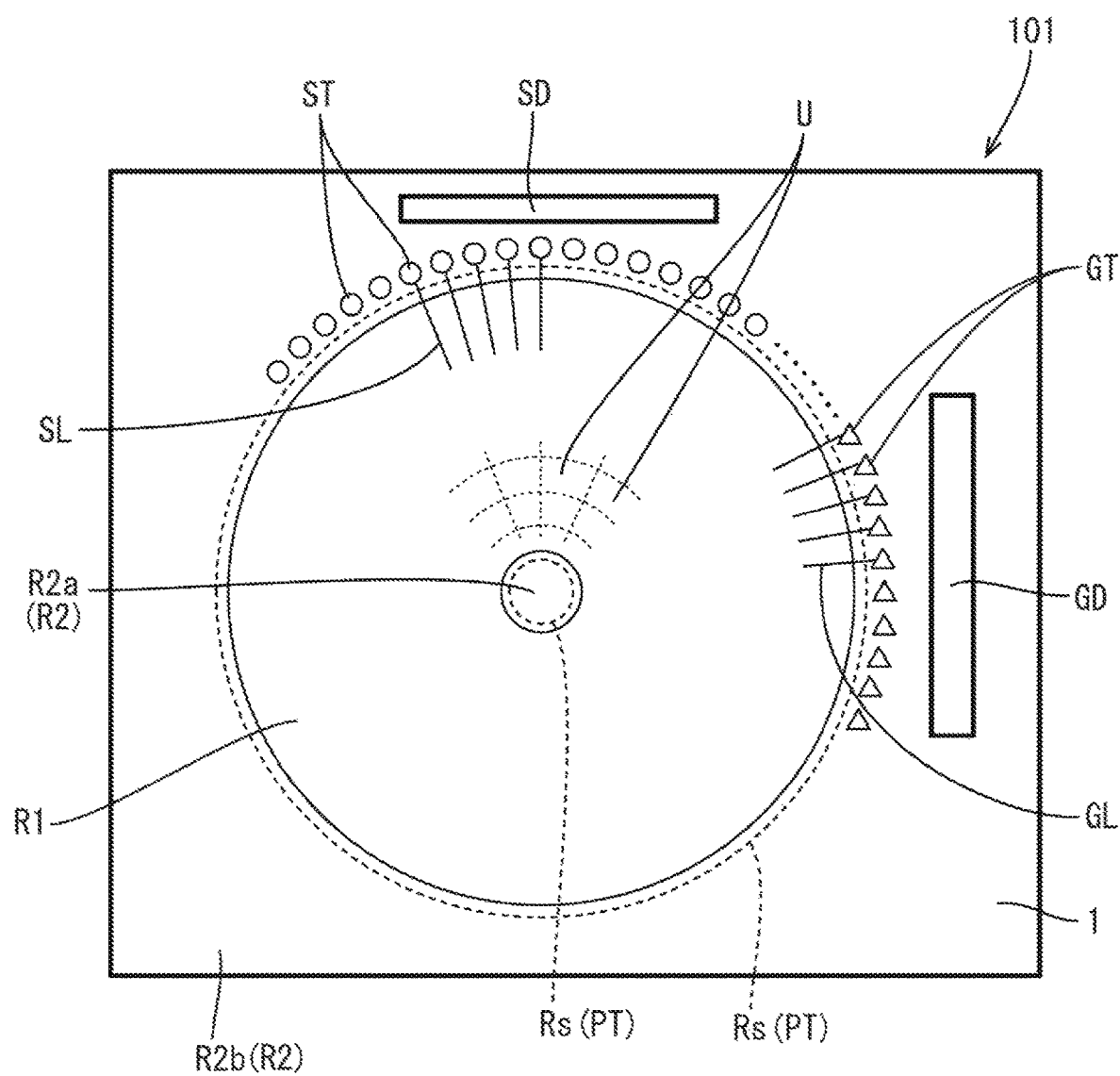
FIG. 3 is a plan view schematically illustrating a TFT board included in the scanning antenna.
Figure 4:
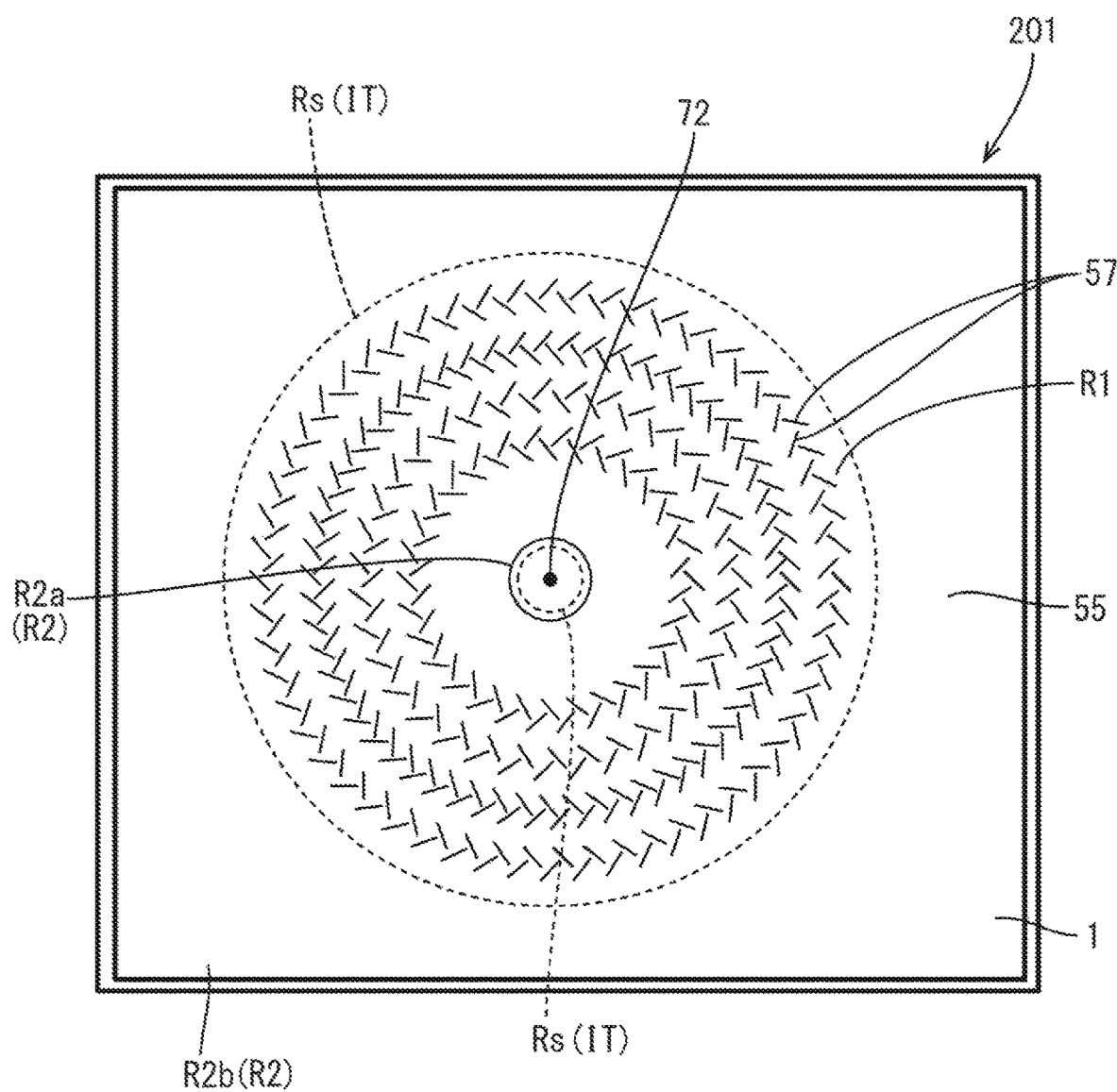
FIG. 4 is a plan view schematically illustrating a slot board included in the scanning antenna.

FIG. 3 is a plan view schematically illustrating the TFT board 101 included in the scanning antenna 1000. FIG. 4 is a plan view schematically illustrating the slot board 201 included in the scanning antenna 1000. The region of the TFT board 101 and the region of the slot board 201 corresponding to the antenna unit U are referred to as "antenna unit regions" and denoted with the same reference numeral as the antenna units. In addition, as illustrated in FIGS. 3 and 4, in the TFT board 101 and the slot board 201, a region including the two-dimensionally arranged antenna unit regions U is referred to as "transmission/reception region R1", and a region other than the transmission/reception region R1 is referred to as a "non-transmission/reception region R2". A terminal, a drive circuit, and other components are disposed in the non-transmission/reception region R2.

The transmission/reception region R1 has a ring-like shape in plan view. The non-transmission/reception region R2 includes a first non-transmission/reception region R2a located at substantially the center of the transmission/reception region R1 and a second non-transmission/reception region R2b located at the outer periphery of the transmission/reception region R1. The outer diameter of the transmission/reception region R1 is not less than 200 mm and not more than 1,500 mm, for example, and is suitably determined according to the data traffic volume, for example.

Multiple gate bus lines GL and multiple source bus lines SL, which are supported by the dielectric substrate 1, are disposed in the transmission reception region R1 of the TFT board 101. The antenna unit regions U are controlled by using these wiring lines. The antenna unit regions U each include the TFT 10 and the patch electrode 15 electrically connected to the TFT 10. The source electrode of the TFT 10 is electrically connected to the source bus line SL, and the gate electrode thereof is electrically connected to the gate bus line GL. In addition, the drain electrode of the TFT 10 is electrically connected to the patch electrode 15.

In the non-transmission/reception region R2 (first and second non-transmission/reception regions R2a and R2b), a seal region Rs having a sealant (not illustrated) surrounds the transmission/reception region R1. The sealant bonds the TFT board 101 and the slot board 201 to each other and seals the liquid crystal material (liquid crystal layer LC1) between the boards 101 and 201. The sealant is described in detail later.

Gate terminals GT, a gate driver GD, source terminals ST, and a source driver SD are disposed outside the seal region RS in the non-transmission/reception region R2. The gate bus lines GL are connected to the gate driver GD through the gate terminals GT. The source bus lines SL are connected to the source driver SD through the source terminals ST. Although the source driver SD and the gate driver GD are disposed on the dielectric substrate 1 of the TFT board 101 in this embodiment, one or both drivers may be disposed on the dielectric substrate 51 of the slot board 201.

In the non-transmission/reception region R2, multiple transfer terminals PT are disposed. The transfer terminals PT are electrically connected to the slot electrode 55 of the slot board 201. In this embodiment, the transfer terminals PT are disposed in both the first non-transmission/reception region R2a and the second non-transmission/reception region R2b. In some embodiments, the transfer terminals PT may be disposed in one of the first and second non-transmission/reception regions R2a and R2b. Furthermore, in the present embodiment, the transfer terminals PT are in the seal region Rs. In this case, a conductive resin containing conductive particles (conductive beads) is used as the sealant.

As illustrated in FIG. 4, in the slot board 201, the slot electrode 55 on the dielectric substrate 51 is disposed over the transmission/reception region R1 and the non-transmission/reception region R2. FIG. 4 illustrates the surface of the slot board 201 viewed from the side of the liquid crystal layer LC1. In FIG. 4, the alignment film OM2 is not illustrated for ease of understanding.

In the transmission/reception region R1 of the slot board 201, the slot electrode 55 has multiple slots 57. The slots 57 correspond to the respective antenna unit regions U of the TFT board 101. In this embodiment, pairs of the slots 57 extending in directions substantially perpendicular to each other are concentrically arranged to form a radial inline slot antenna. Such pairs of slots 57 enable the scanning antenna 1000 to transmit and receive circularly polarized waves.

Multiple terminals IT of the slot electrode 55 are disposed in the non-transmission/reception region R2 of the slot board 201. The terminals IT are electrically connected to the transfer terminals PT of the TFT board 101. In this embodiment, the terminals IT are disposed in the seal region Rs and are electrically connected to the corresponding transfer terminals PT through the sealant formed of the above-described conductive resin containing conductive particles (conductive beads).

Furthermore, in the first non-transmission/reception region R2, the power feed pin 72 is disposed at substantially the center of the concentrically arranged slots 57. The power feed pin 72 emits microwaves to the waveguide 301, which is constituted by the slot electrode 55, the reflective conductive plate 65, and the dielectric substrate 51. The power feed pin 72 is connected to a power feeder 70. The power may be supplied by direct coupling or electromagnetic coupling. A known power supply mechanism may be employed.

Hereinafter, the TFT board 101, the slot board 201, and the waveguide 301 are described in detail.

<Structure of TFT Board 101>

Figure 5:
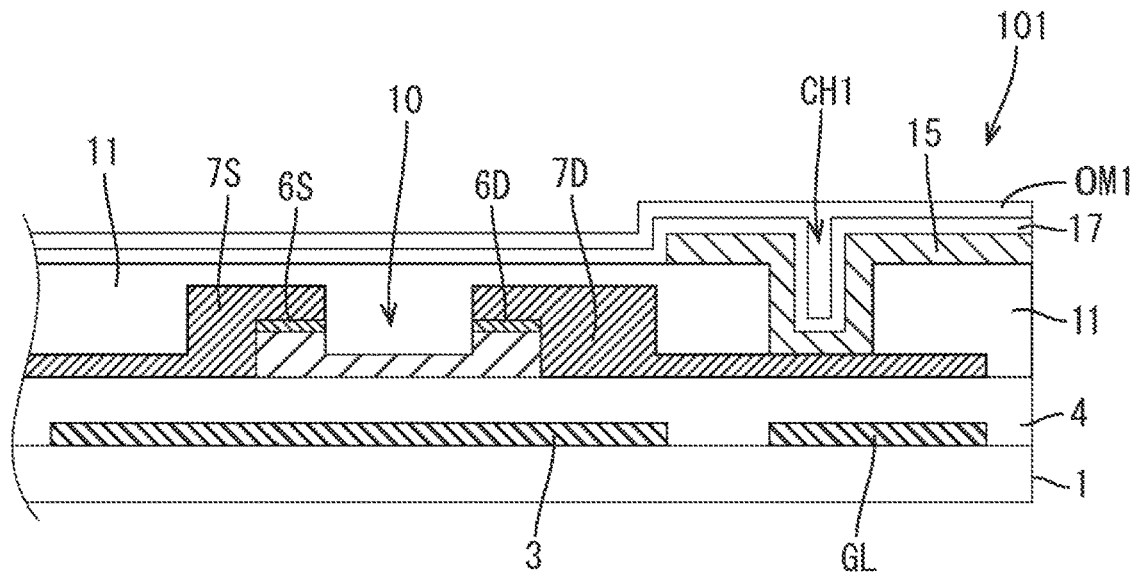
FIG. 5 is a cross-sectional view schematically illustrating an antenna unit region of the TFT board.
Figure 6:
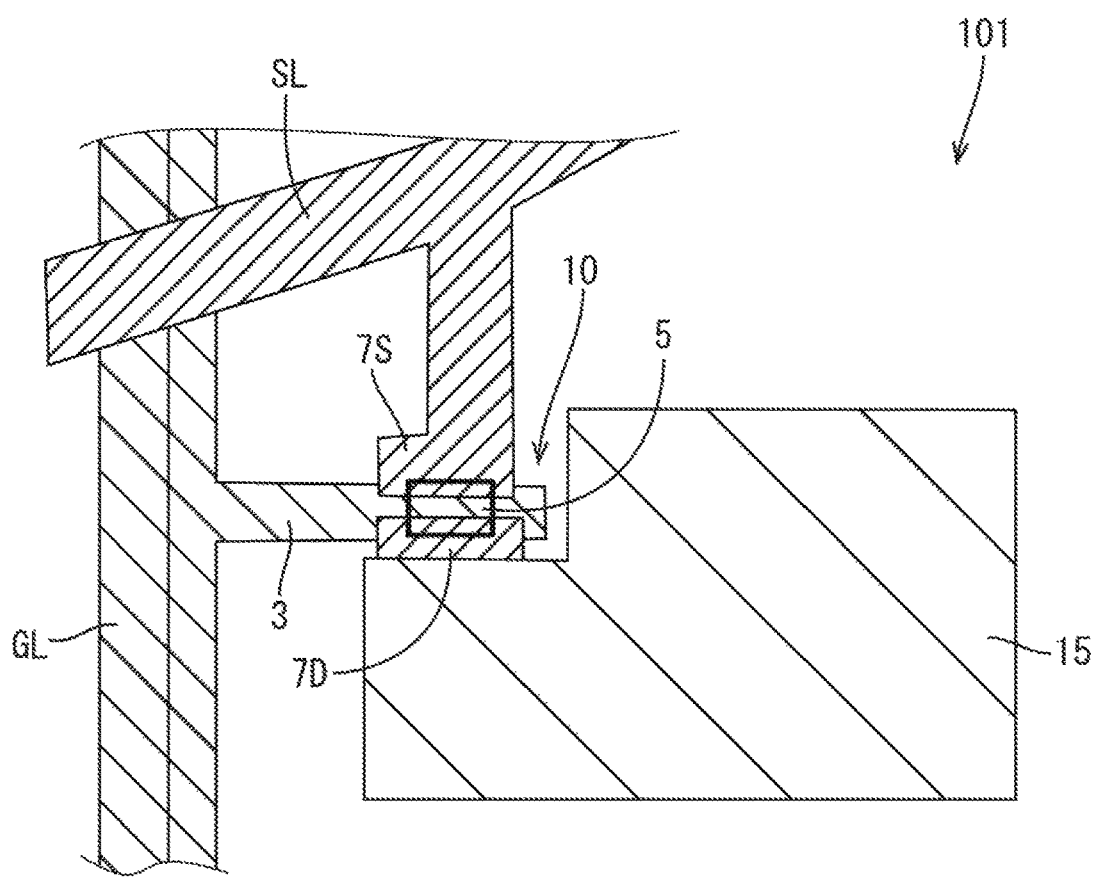
FIG. 6 is a plan view schematically illustrating an antenna unit region of the TFT board.

FIG. 5 is a cross-sectional view schematically illustrating the antenna unit region U of the TFT board 101. FIG. 6 is a plan view schematically illustrating the antenna unit region U of the TFT board 101. FIG. 5 and FIG. 6 each illustrate a cross-sectional structure of a portion of the transmission/reception region R1.

The antenna unit regions U of the TFT board 101 each include the dielectric substrate (first dielectric substrate) 1, the TFT 10 supported by the dielectric substrate 1, a first insulating layer 11 covering the TFT 10, the patch electrode 15 disposed on the first insulating layer 11 and electrically connected to the TFT 10, a second insulating layer 17 covering the patch electrode 15, and the alignment film OM1 covering the second insulating layer 17.

The TFT 10 includes a gate electrode 3, an island-shaped semiconductor layer 5, a gate insulating layer 4 disposed between the gate electrode 3 and the semiconductor layer 5, a source electrode 7S, and a drain electrode 7D. In this embodiment, the TFT 10 is a channel-etched TFT having a bottom gate structure. In some embodiments, the TFT 10 may have a different structure.

The gate electrode 3 is electrically connected to the gate bus line GL to receive a scanning signal through the gate bus line GL. The source electrode 7S is electrically connected to the source bus line SL to receive a data signal through the source bus line SL. The gate electrode 3 and the gate bus line GL may be formed of the same conductive film (gate conductive film). The source electrode 7S, the drain electrode 7D, and the source bus line SL may be formed of the same conductive film (source conductive film). The gate conductive film and the source conductive film are metal films, for example. A layer formed of a gate conductive film may be referred to as a "gate metal layer". A layer formed of a source conductive film may be referred to as a "source metal layer".

The semiconductor layer 5 overlaps the gate electrode 3 with the gate insulating layer 4 therebetween. As illustrated in FIG. 5, a source contact layer 6S and a drain contact layer 6D are disposed on the semiconductor layer 5. The source contact layer 6S and the drain contact layer 6D on the semiconductor layer 5 are located on opposite sides of a region that has a channel (channel region). In this embodiment, the semiconductor layer 5 is an intrinsic amorphous silicon (i-a-Si) layer, and the source contact layer 6S and the drain contact layer 6D are n$^+$ amorphous silicon (n$^+$-a-Si) layers. In some embodiments, the semiconductor layer 5 may be a polysilicon layer or an oxide semiconductor layer, for example.

The source electrode 7S is in contact with the source contact layer 6S and is connected to the semiconductor layer 5 through the source contact layer 6S. The drain electrode 7D is in contact with the drain contact layer 65 and is connected to the semiconductor layer 5 through the drain contact layer 6D.

The first insulating layer 11 has a contact hole CH1 extending to the drain electrode 7D of the TFT 10.

The patch electrode 15 is disposed on the first insulating layer 11 and in the contact hole CH1 where the patch electrode 15 is in contact with the drain electrode 7D. The patch electrode 15 is mainly formed of a metal layer. The patch electrode 15 may be a metal electrode formed only of a metal layer. The material of the patch electrode 15 may be the same as that of the source electrode 7S and the drain electrode 7D. The thickness of the metal layer of the patch electrode 15 (the thickness of the patch electrode 15 when the patch electrode 15 is a metal electrode) may be equal to that of the source electrode 7S and that of the drain electrode 7D but is preferably larger than that of the source electrode 7S and that of the drain electrode 7D. The patch electrode 15 having a large thickness has a low electromagnetic wave transmittance and has a lower sheet resistance, and thus the oscillation energy of free electrons in the patch electrode is less likely to be converted into heat.

Furthermore, a CS bus line CL formed of the same conductive film as that of the gate bus line CL may be disposed. The CS bus line CL overlaps the drain electrode 7D (or the extension of the drain electrode 7D) with the gate insulating layer 4 therebetween and may form an auxiliary capacitor CS including the gate insulating layer 4 as a dielectric layer.

In this embodiment, the patch electrode 15 is disposed in a layer that is not the source metal layer. This allows the thickness of the source metal layer and the thickness of the patch electrode 15 to be separately controlled.

The patch electrode 15 may include a Cu layer or an Al layer as a main layer. The performance of the scanning antenna has a correlation with the electric resistance of the patch electrode 15, and the thickness of the main layer is determined such that a predetermined resistance is obtained. The resistance of the patch electrode 15 is preferably low enough not to prevent electron oscillation. The thickness of the metal layer of the patch electrode 15 is not less than 0.5 µm, for example, when the metal layer is formed of an Al layer.

The alignment film OM1 is formed of a polyimide resin. The alignment film OM1 is described in detail later.

The TFT board 101 is produced by the following method, for example. First, the dielectric substrate 1 is provided. The dielectric substrate 1 may be a glass substrate or a heat-resistant plastic substrate, for example. A gate metal layer including the gate electrode 3 and the gate bus line GL is formed on the dielectric substrate 1.

The gate electrode 3 and the gate bus line GL may be integrally formed. Here, a gate conductive film (having a thickness of not less than 50 nm and not more than 500 nm) is formed by sputtering, for example, on the dielectric substrate 1. Then, the gate conductive film is patterned to form the gate electrode 3 and the gate bus line GL. Examples of the material of the gate conductive film include, but are not limited to, metals such as aluminum (Al), tungsten (W), molybdenum (Mo), tantalum (Ta), chromium (Cr), titanium (Ti), and copper (Cu), alloys of these metals, and metal nitrides of these metals. Here, the gate conductive film is a layered film in which MoN (thickness of 50 nm, for example), Al (thickness of 200 nm, for example), and MoN (thickness of 50 nm) are laminated in this order.

Next, the gate insulating layer 4 is formed to cover the gate metal layer. The gate insulating layer 4 is formed by a CVD method, for example. The gate insulating layer 4 may be a silicon oxide (SiO$_2$) layer, a silicon nitride (SiNx) layer, a silicon oxynitride (SiOxNy; x>y) layer, or a silicon nitride oxide (SiNxOy; x>y) layer, for example. The gate insulating layer 4 may have a layered structure. Here, the gate insulating layer 4 is a SiNx layer (thickness of 410 nm, for example).

Next, the semiconductor layer 5 and a contact layer are formed on the gate insulating layer 4. Here, an intrinsic amorphous silicon film, (thickness of 125 nm, for example) and an n+ amorphous silicon film (thickness of 65 nm, for example) are formed in this order and patterned to obtain the island-shaped semiconductor layer 5 and the contact layer.

The semiconductor film forming the semiconductor layer 5 is not limited to the amorphous silicon film. For example, the semiconductor layer 5 may be an oxide semiconductor layer. In such a case, the contact layer between the semiconductor layer 5 and the source/drain electrodes may be eliminated.

Next, the source conductive film (thickness of not less than 50 nm and not more than 500 nm, for example) is formed on the gate insulating layer 4 and the contact layer and patterned to form the source metal layer including the source electrode 7S, the drain electrode 7D, and the source bus line SL. At this time, the contact layer is also etched to be separated into the source contact layer 6S and the drain contact layer 6D away from each other.

Examples of the material of the source conductive film include, but are not limited to, metals such as aluminum (Al), tungsten (W), molybdenum (Mo), tantalum (Ta), chromium (Cr), titanium (Ti), and copper (Cu), alloys of these metals, and nitrides of these metals. Here, the source conductive film is a layered film in which MoN (thickness of 30 nm, for example), Al (thickness of 200 nm, for example), and MoN (thickness of 50 nm, for example) are laminated in this order.

Here, for example, the source conductive film is formed by sputtering and then patterned by wet etching (source/drain separation). Then, a portion of the contact layer corresponding to the region that becomes the channel region of the semiconductor layer 5 is removed by dry etching, for example, to form a gap portion, which separates the contact layer into the source contact layer 6S and the drain contact layer 6D. At this time, in the gap portion, the semiconductor layer 5 is also etched (over etching) at a portion near the surface.

Next, the first insulating layer 11 is formed to cover the TFT 10. In this example, the first insulating layer 11 is in contact with the channel region of the semiconductor layer 5. Furthermore, the contact hole CH1 extending the drain electrode 7D is formed in the first insulating layer 11 by a known photolithographic method.

The first insulating layer 11 may be formed of an inorganic insulating film, such as a silicon oxide ($SiO_2$) film, a silicon nitride (SiNx) film, a silicon oxynitride (SiOxNy; x>y) film, and a silicon nitride oxide (SiNxOy; x>y) film. Here, as the first insulating layer 11, a SiNx layer having a thickness of 330 nm, for example, is formed by a CVD method.

Next, the patch conductive film is formed on the first insulating layer 11 and in the contact hole CH1 and is patterned. In this way, the patch electrodes 15 are formed in the transmission/reception region R1. In the non-transmission/reception region R2, a patch connection portion formed of the same conductive film (patch conductive film) as the patch electrode 15 is formed. The patch electrode 15 is in contact with the drain electrode 7D at a portion in the contact hole CH1.

The same material as that of the gate conductive film or the source conductive film may be used as the material of the patch conductive film. However, the patch conductive film preferably has a larger thickness than the gate conductive film and the source conductive film. The patch conductive film preferably has a thickness of not less than 1 μm and not more than 30 μm, for example. If the thickness is smaller than the above range, the electromagnetic wave transmission becomes about 30% and the sheet resistance becomes 0.03 Ω/sq or more, leading to large loss. If the thickness is larger than the above range, patterning of the slots 57 may become difficult.

Here, the patch conductive film is a layered film (MoN/Al/MoN) in which MoN (thickness of 50 nm, for example), Al (thickness of 1000 nm, for example), and MoN (thickness of 50 nm, for example) are laminated in this order.

Next, the second insulating layer (thickness of not less than 100 nm and not more than 300 nm, for example) 17 is formed on the patch electrode 15 and the first insulating layer 11. Examples of the second insulating layer 17 include, but are not limited to, a silicon oxide ($SiO_2$) film, a silicon nitride (SiN) film, a silicon oxynitride (SiOxNy; x>y) film, and a silicon nitride oxide (SiNxOy; x>y) film. Here, the second insulating layer 17 is a SiNx layer having a thickness of 200 nm, for example.

Subsequently, the inorganic insulating films (the second insulating layer 17, the first insulating layer 11, and the gate insulating layer 4) are collectively etched by dry etching using a fluorine-based gas, for example. In the etching, trite patch electrode 15, the source bus line SL, and the gate bus line GL function as an etch stop. Thus, a second contact hole extending to the gate bus line GL is formed in the second insulating layer 17, the first insulating layer 11, and the gate insulating layer 4, and a third contact hole extending to the source bus line SL is formed in the second insulating layer 17 and the first insulating layer 11. Furthermore, a fourth contact hole extending to the above-described patch connection portion is formed in the second insulating layer 17.

Next, a conductive film (thickness of not less than 50 nm and not more than 200 nm) is formed by sputtering, for example, on the second insulating layer 17 and in the second, third, and fourth contact holes. A transparent conductive film such as an indium tin oxide (ITO) film, an IZO film, and a zinc oxide (ZnO) film may be used as the conductive film. Here, an ITO film having a thickness of 100 nm, for example, is used as the conductive film.

Then, the transparent conductive film is patterned to form a gate terminal upper connection portion, a source terminal upper connection portion, and a transfer terminal upper connection portion. The gate terminal upper connection portion, the source terminal upper connection portion, and the transfer terminal upper connection portion protect electrodes or wiring lines exposed at the terminals. The gate terminals GT, the source terminals ST, and the transfer terminals PT are obtained in this way.

Then, the alignment film OM1 is formed to cover the second insulating film 17, for example. The alignment film OM is described in detail later. The TFT board 101 is produced in this way.

<Structure of Slot Board 201>

Figure 7:
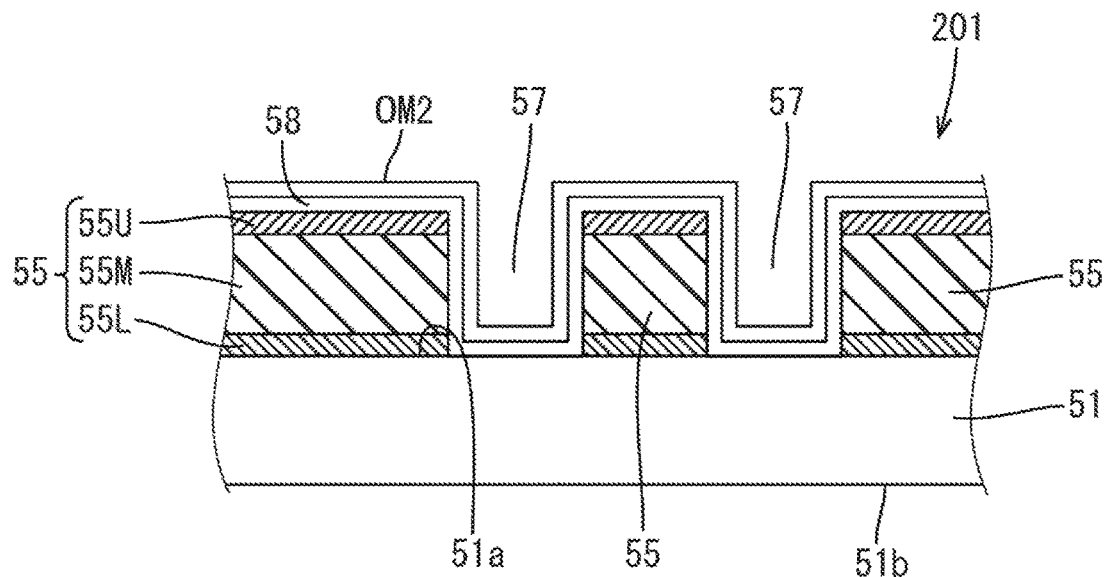
FIG. 7 is a cross-sectional view schematically illustrating an antenna unit region of the slot board.

Next, the structure of the slot board 201 is described in more detail. FIG. 7 is a cross-sectional view schematically illustrating an antenna unit region U of the slot board 201.

The slot board 201 mainly includes the dielectric substrate (second dielectric substrate) 51, the slot electrode 55 on a surface 51a (surface facing the liquid crystal layer and the TFT board 101) of the dielectric substrate 51, and the third insulating layer 58 covering the slot electrode 55, and the alignment film OM2 covering the third insulating layer 58.

In the transmission/reception region R1 of the slot board 201, the slot electrode 55 has multiple slots 57 (FIG. 3). The slots 57 are openings (grooves) extending through the slot electrode 55. In this example, each antenna unit region U has one slot 57.

The slot electrode 55 includes a main layer 55M, such as a Cu layer and an Al layer. The slot electrode 55 may have a layered structure that further includes an upper layer 55U and a lower layer 55L sandwiching the main layer 55M. The thickness of the main layer 55M is determined depending on the material in view of the skin effect and may be not less than 2 μm and not more than 30 μm, for example. The thickness of the main layer 55M is usually greater than the thickness of the upper layer 55U and the lower layer 55L.

In this example, the main layer 55M is a Cu layer and the upper layer 55U and the lower layer 55L are Ti layers. The lower layer 55L between the main layer 55M and the dielectric substrate 51 improves the adhesion between the slot electrode 55 and the dielectric substrate 51. The upper layer 55U reduces corrosion of the main layer 55M (Cu layer, for example).

The third insulating layer 58 is formed on the slot electrode 55 and in the slot 57. Examples of the material of the third insulating layer 58 include, but are not limited to, a silicon oxide (Sift) film, a silicon nitride (SiNx) film, a silicon oxynitride (SiOxNy; x>y) film, and a silicon nitride oxide (SiNxOy; x>y) film.

The alignment film OM2 is formed of a polyimide resin as she alignment film OM of the TFT board 101. The alignment film OM2 is described in detail later.

In the non-transmission/reception region R2 of the slot board 201, terminals IT are disposed (FIG. 4). The terminal IT includes a portion of the slot electrode 55, the third insulating layer 58 covering the portion of the slot electrode 55, and an upper connection portion. The third insulating layer 58 has an opening (contact hole) extending to the portion of the slot electrode 55. In the opening, the upper connection portion is in contact with the portion of the slot electrode 55. In this embodiment, the terminal IT is a conductive layer formed of an ITO film or an IZO film, for example, and is disposed in the seal region Rs. The terminal IT is connected to the transfer terminal PT of the TFT board 101 by a seal resin containing conductive particles (conductive beads, such as Au beads).

The slot board 201 is produced by the following method, for example. First, the dielectric substrate 51 is provided. The dielectric substrate 51 may be a substrate having a high transmittance (small dielectric constant εM and small dielectric loss tan δM) with respect to electromagnetic waves, such as a glass substrate and a resin substrate. The dielectric substrate preferably has a small thickness to reduce attenuation of the electromagnetic waves. For example, the glass substrate may be made thinner from the rear side after formation of components such as the slot electrode 55 on the surface of the glass substrate by a process described later. This allows the thickness of the glass substrate to be 500 μm or less, for example. Typically, resin has a smaller dielectric constant EM and a smaller dielectric loss tan δM than glass. When the dielectric substrate 51 is a resin substrate, the thickness thereof is not less than 3 μm and not more than 300 μm, for example. The material of the resin substrate may be polyimide, for example.

A metal film is formed on the dielectric substrate 51 and is patterned to obtain the slot electrode 55 having the multiple slots 57. The metal film may be a Cu film (or Al film) having a thickness of not less than 2 μm and not more than 5 μm. Here, the metal film is a layered film in which a Ti film, a Cu film, and a Ti film are laminated in this order.

Then, the third insulating layer (thickness of not less than 100 nm and not more than 200 nm, for example) 58 is formed on the slot electrode 55 and in the slots 57. Here, the third insulating layer 58 is formed of a silicon oxide (Sift) film.

Subsequently, in the non-transmission/reception region R2, an opening (contact hole) extending to a portion of the slot electrode 55 is formed in the third insulating layer 58.

Then, a transparent conductive film is formed on the third insulating layer 58 and in the opening of the third insulating layer 58 and is patterned to form the upper connection portion that is in contact with a portion of the slot electrode 55 in the opening. Thus, the terminal IT to be connected to the transfer terminal PT of the TFT board 101 is obtained.

Then, the alignment film OM2 is formed to cover the third insulating layer 58. The alignment film OM2 is described in detail later. The slot board 201 is produced in this way.

(Structure of Waveguide 301)

In the waveguide 301, the reflective conductive plate 65 faces the slot electrode 55 with the dielectric substrate 51 therebetween. The reflective conductive plate 65 faces the rear surface of the dielectric substrate 51 with the air layer 54 therebetween. Since the reflective conductive plate 65 serves as a wall of the waveguide 301, the thickness of the reflective conductive plate 65 is preferably three times or greater than the skin depth, and more preferably five times or greater than the skin depth. A cut-out aluminum plate or copper plate, for example, having a thickness of a few millimeters may be used as the reflective conductive plate 65.

For example, while the scanning antenna 1000 is in a transmission mode, the waveguide 301 allows the microwaves from the power feed pin 72, which is located at substantially the center of the concentrically-arranged antenna units U, to radiate toward the outside. The microwaves traveling through the waveguide 301 are cut at the slot 57 of the antenna unit U, generating an electrical field based on the slot antenna principle. The electric field induces electrical charges in the slot electrode 55 (i.e., the microwaves induce oscillation of free electrons in the slot electrode 55). In the antenna units U, the phase of the oscillation of free electrons induced in the patch electrode 15 is control led by changing the capacitance of the liquid crystal capacitor through the alignment control of the liquid crystals. The electrical field is generated when the electrical charges are induced in the patch electrode 15 (i.e., oscillation energy is transferred from the free electrons in the slot electrode 55 to the free electrons in the patch electrode 15), and the microwaves (radio waves) are emitted from the patch electrode 15 of each antenna unit U toward the outside of the TFT board 101. The angle of direction of the beam is controlled by combining the microwaves (radio waves) from the antenna units U, which have different phases.

In some embodiments, the waveguide may have a two-layered structure including: an upper layer and a lower layer. In such a case, the microwaves emitted by the power supply pin travels radially in the lower layer from the center toward the outer side and then travels upward at the outer wall of the lower layer to the upper layer. Then, the microwaves at the outer side of the upper layer gather at the center. Such a two-layered structure allows the microwaves to readily uniformly spread over each antenna unit U.

(Alignment Film OM (OM1, OM2))

For example, polyamic acid represented by the following chemical formula (1) is imidized as indicated by the following chemical formula (2) and is subjected to an alignment treatment such as a rubbing process to form the alignment films OM1 and OM2 (hereinafter, may be collectively referred to as "alignment film OM") included in the TFT board 101 and the slot board 201 of the embodiment. The alignment film OM that has been subjected to the alignment treatment has a function of orientating the liquid crystal component in a predetermined direction.

[Chem. 1]
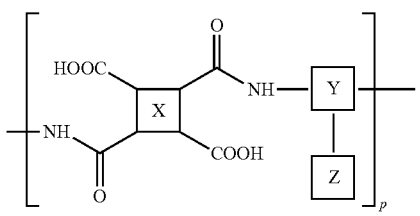
(1)
[Chem. 2]
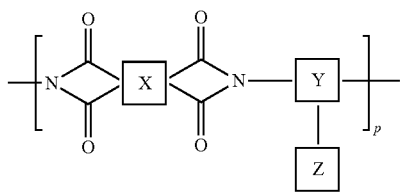
(2)
In the chemical formulas (1) and (2), p is any natural number. In the chemical formulas (1) and (2), X has a structure represented by the following chemical formulas (3-1) to (3-16).
[Chem. 3]
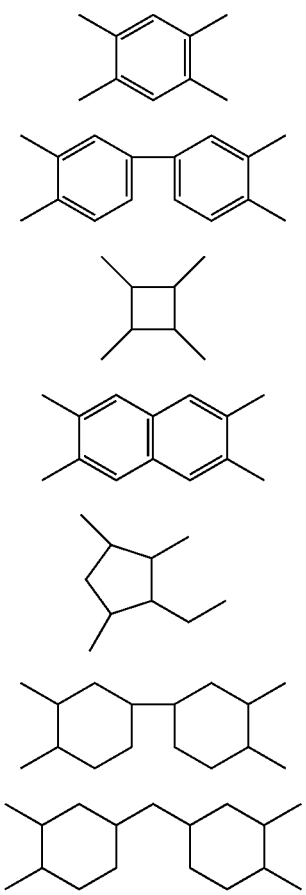
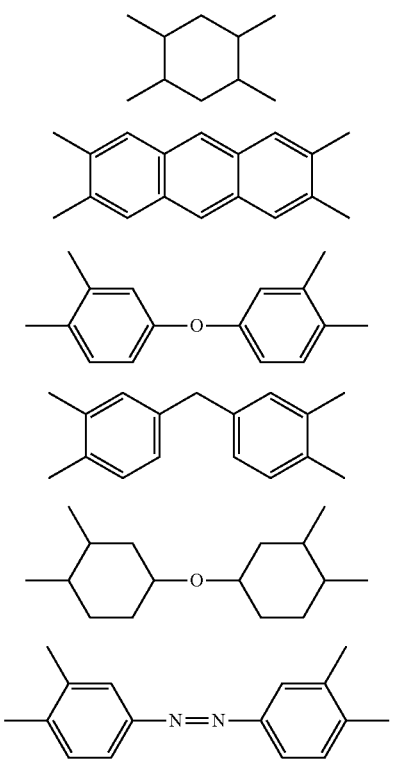
Furthermore, in the chemical formulas (1) and (2), Y has a structure represented by the following chemical formulas (4-1) to (4-24).
[Chem. 4]
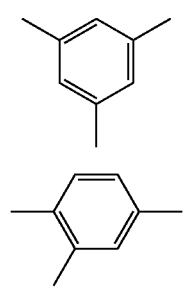

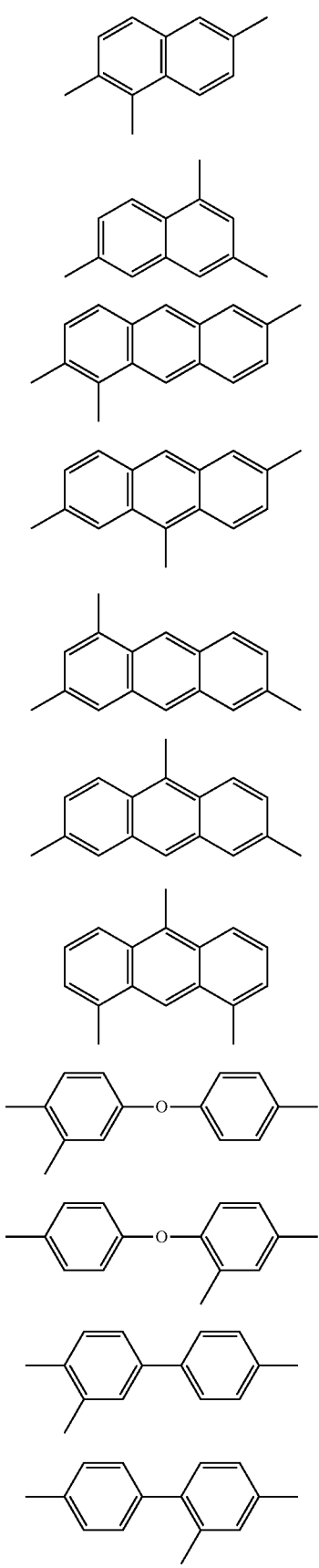
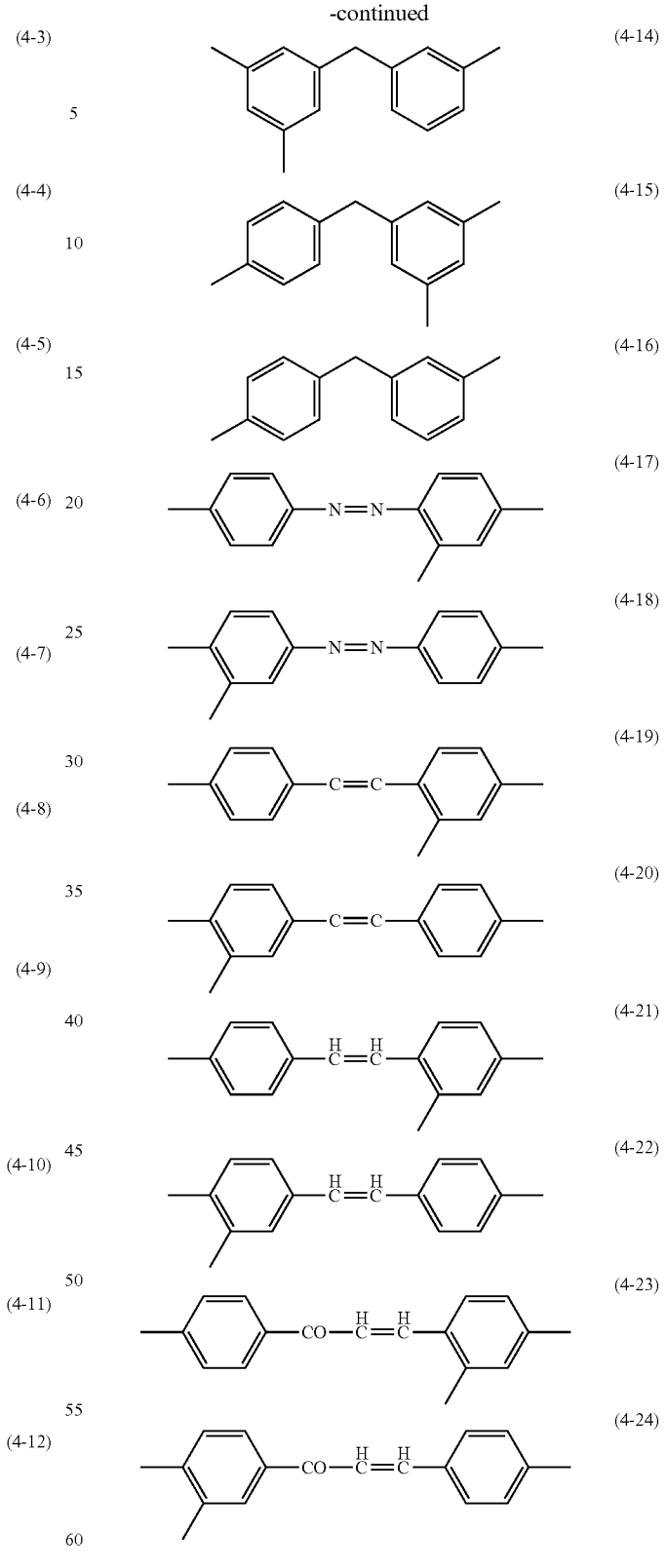
In the chemical formulas (1) and (2), Z represents a side chain. Z may have any structure without departing from the scope of the invention or may be eliminated. When the chemical formulas (1) and (2) do not have Z, the chemical formulas (4-1) to (4-24) have liking groups at any two positions.

The polyamic acid represented by the chemical formula (1) is imidized by being heated at a high temperature (for example, 200 to 250° C.), for example. Alternatively, chemical imidization may be employed in which acetic anhydride, for example, used as a dehydrating agent and pyridine, for example, is used as a catalyst. Although the imidization rate of polyimide represented by the chemical formula (2) may be any rate without departing from the scope of the invention, the imidization rate is preferably 50% or more, for example. If the imidization rate is lower than 50%, a thiourethane bond insoluble in the liquid crystal material and a bond ($C_6H_4$—NH—CS—O—) for example, may be readily generated by reaction between the isothiocyanate group and the carboxyl group in the liquid crystal material.

The alignment film OM may be a horizontal alignment film in which the alignment direction is horizontal with respect to the surface of the substrate or may be a vertical alignment film in which the alignment direction is vertical with respect to the surface of the substrate.

The polyamic acid may be polymerized by any known method. The polyamic acid may be dissolved in an appropriate organic solvent to be a composition (alignment agent) in the form of flowable liquid or sol.

In this embodiment, both the TFT board 101 and the slot board 201 have the alignment films OM (alignment films OM1 and OM2). However, in some embodiments, the alignment film OM may be included in only one of the TFT board 101 and the slot board 201.

In the formation of the alignment film OM, first, an uncured flowable alignment agent including a polyamic acid represented by the chemical formula (1) is applied to the surfaces of the substrates 101 and 201 by using a coater. The applied agent is first subjected to preliminary firing (for example, a heat treatment at 80° C. for two minutes) and then subjected to a main firing (for example, a heat treatment at 210° C. for ten minutes). Then, the applied agent after the main firing is subjected to a rubbing process to form the alignment film OM that is able to orient the liquid crystal compound in a predetermined direction. The polyamic acid is imidized in the preliminary firing or the main firing.

(Liquid Crystal Layer LC1 (Liquid Crystal Compound))

A liquid crystal compound containing an isothiocyanate group that has high dielectric anisotropy (Δε) (for example, 10 or more) is used as the liquid crystal material (liquid crystal compound) constituting the liquid crystal layer. The liquid crystal compound containing an isothiocyanate group may be one represented by the following chemical formula (5-1) or (5-2). The chemical formulas (5-1) and (5-2) are referred to as chemical formulas (1-1) and (1-2) in claim.

[Chem. 5]

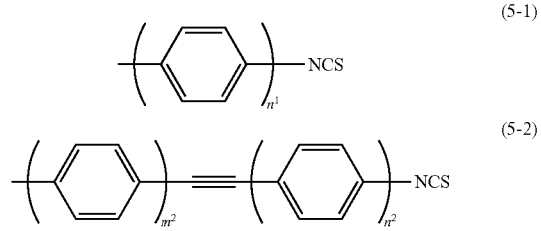

(5-1)

(5-2)

In the above chemical formulas (5-1) and (5-2), each of $n^1$, $m^2$, and $n^2$ is an integer of 1 to 5, and H in the phenylene group may be substituted by F or Cl.

The liquid crystal material may contain a liquid crystal compound other than the liquid crystal compound containing an isothiocyanate group without departing from the scope of the invention.

(Antenna Unit U)

Figure 8:
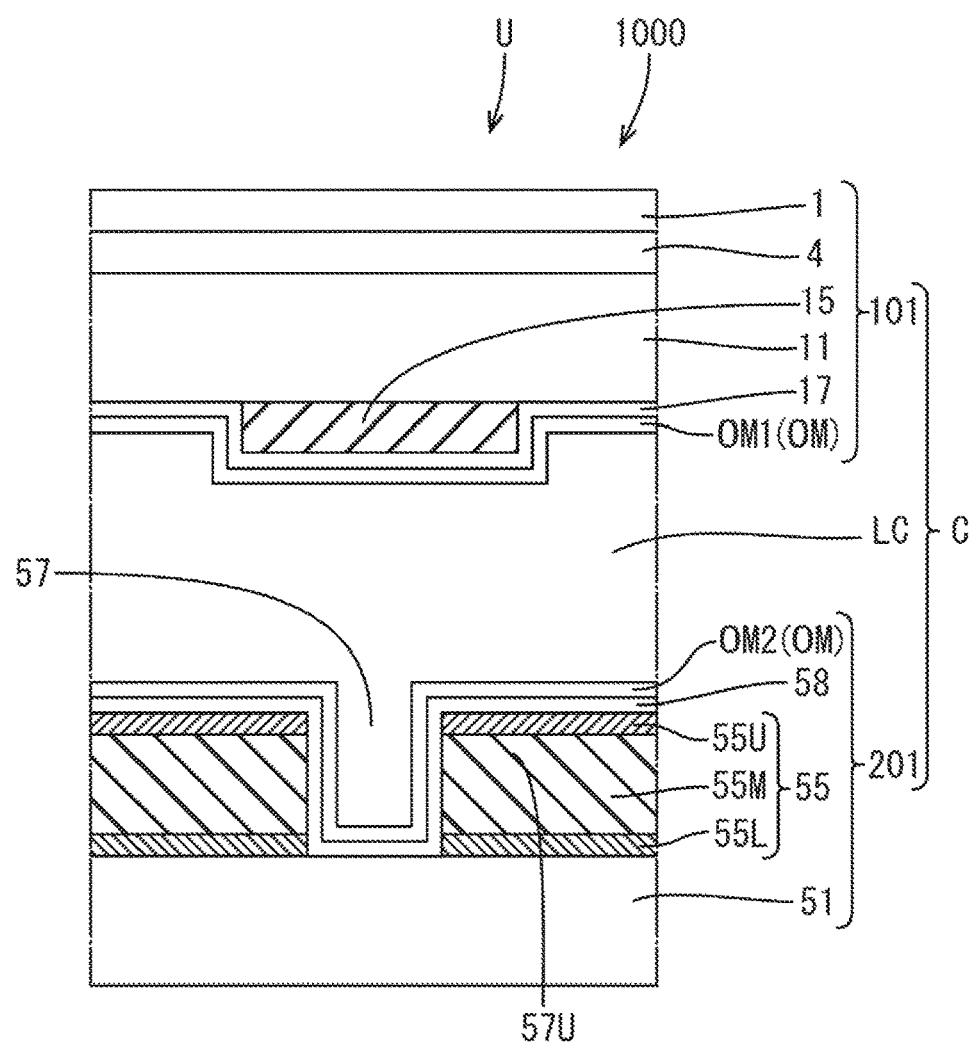
FIG. 8 is a cross-sectional view schematically illustrating the TFT board, the liquid crystal layer, and the slot board, which constitute the antenna unit of the scanning antenna.

FIG. 8 is a cross-sectional view schematically illustrating the TFT board 101, the liquid crystal layer LC1, and the slot board 201, which constitute the antenna unit U of the scanning antenna 1000. As illustrated in FIG. 8, in the antenna unit U, the island-shaped patch electrode 15 of the TFT board 101 faces the hole-shaped (groove-shaped) slot 57 (slot electrode unit 57U) of the slot electrode 55 included in the slot board 201 with the liquid crystal layer LC1 therebetween. The scanning antenna 1000 having such a configuration includes a liquid crystal cell C including the liquid crystal layer LC1, the TFT board 101, and the slot board 201. The boards 101 and 201 sandwich the liquid crystal layer LC1 therebetween and include the alignment films OM1 and OM2 at sides adjacent to the liquid crystal layer LC1. In this specification, the antenna unit U includes one patch electrode 15 and a portion of the slot electrode 55 (slot electrode unit 57U) having at least one slot 57 corresponding to the patch electrode 15.

(Sealant)

Figure 9:
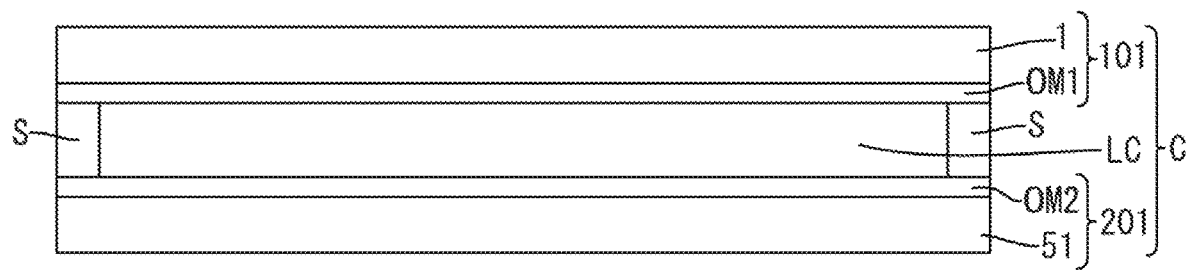
FIG. 9 is a cross-sectional view schematically illustrating a structure of a liquid crystal cell.

FIG. 9 is a cross-sectional view schematically illustrating a configuration of the liquid crystal cell C. A sealant S is disposed between the TFT board 101 and the slot board 201, which constitute the liquid crystal cell C, and surrounds the liquid crystal layer LC1.

The sealant S is a cured curable resin composition containing a curable resin. The curable resin may be a photocurable composition that is cured by light (such as ultraviolet light and visible light) and/or thermosetting resin that is cured by heat. The kind of sealant S is suitably determined depending on how the liquid crystal material is injected. For example, when the liquid crystal material is injected into the liquid crystal cell C by a one drop fill process (ODF process), the curable resin may be a photocurable (visible light curable resin, for example) and thermosetting resin, because the curing of such a resin is readily controlled by two separate steps of precuring and final curing, for example. An example of such a curable resin is a mixture of an epoxy resin and an acrylic resin (trade name "UVAC1561" available from Daicel-UCB Company, Ltd), for example. When the liquid crystal material is injected into the liquid crystal cell C by a vacuum impregnation method, the curable resin may be a photocurable resin or a thermosetting resin.

Figure 10:
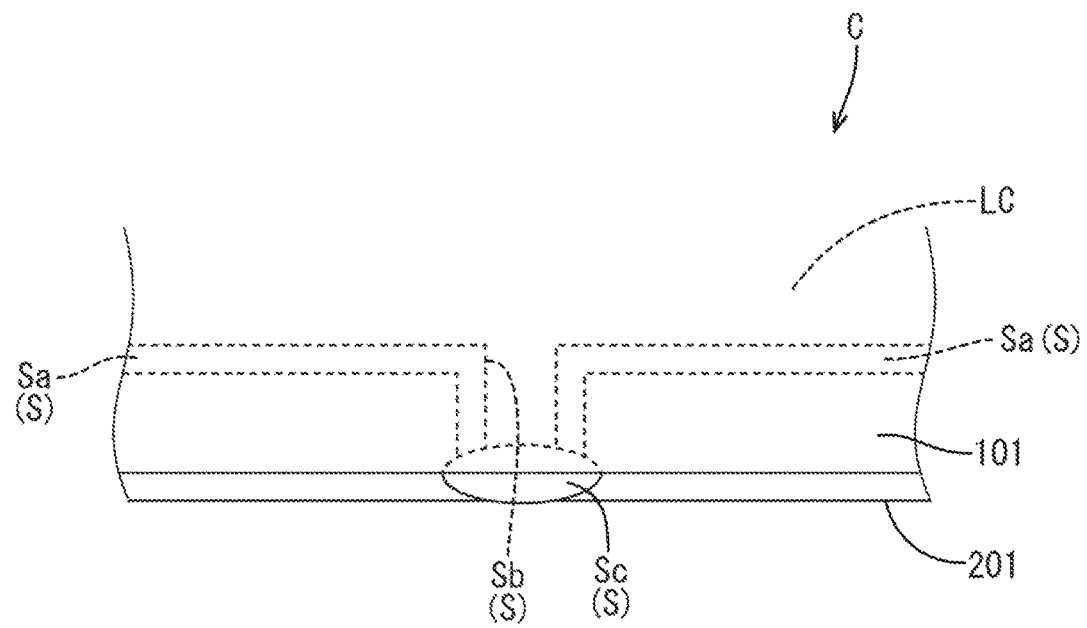
FIG. 10 is a magnified view schematically illustrating the inlet portion and the sealing portion of the liquid crystal cell including a liquid crystal material injected by using a vacuum impregnation method.

As illustrated in FIG. 10, when the liquid crystal material is injected into the liquid crystal cell C by a vacuum impregnation method, the sealant S has an inlet portion Sb having a hole through which the liquid crystal material is injected. The inlet portion Sb is a portion of the sealant S and allows the liquid crystal layer LC1 and the outside to be in communication with each other. The sealant S used in the vacuum impregnation method surrounds the liquid crystal layer LC1 and includes a sealant body Sa that has the inlet portion Sb. The hole in the inlet portion Sb is sealed with a sealing material after the liquid crystal material is injected into the space on the inner side of the sealant body Sa through the inlet portion Sb. The portion provided by the sealing material sealing the inlet portion Sb is referred to as a sealing portion Sc. In this specification, the sealing portion Sc constitutes a portion of the sealant S surrounding the liquid crystal layer LC1.

The sealant S adheres to the TFT board 101 and the slot board 201 to attach the TFT board 101 and the slot board 201 to each other.

The composition (curable resin composition) constituting the sealant S in this embodiment further contains an ene compound, a thiol compound, and a radical polymerization initiator, which generates a radical by using light or heat, to scavenge outside oxygen ($O_2$) entering the liquid crystal material (liquid crystal layer LC1) during the production of the liquid crystal cell C.

For example, when a one drop fill process (ODF process) is used to inject the liquid crystal material into the liquid crystal cell C, the composition to scavenge oxygen (the ene compound, the thiol compound, and the radical polymerization initiator) is contained in the curable resin composition together with the curable resin. When a vacuum impregnation method is used to inject the liquid crystal material into the liquid crystal cell C, the composition to scavenge oxygen (the ene compound, the thiol compound, and the radical polymerization initiator) is contained in the sealing material (sealing material composition) that forms the sealing portion Sc. When a vacuum impregnation method is used to inject the liquid crystal material into the liquid crystal cell C, the composition to scavenge oxygen (the ene compound, the thiol compound, and the radical polymerization initiator) may be contained in the curable resin composition that forms the sealant body Sa if needed.

Figure 11:
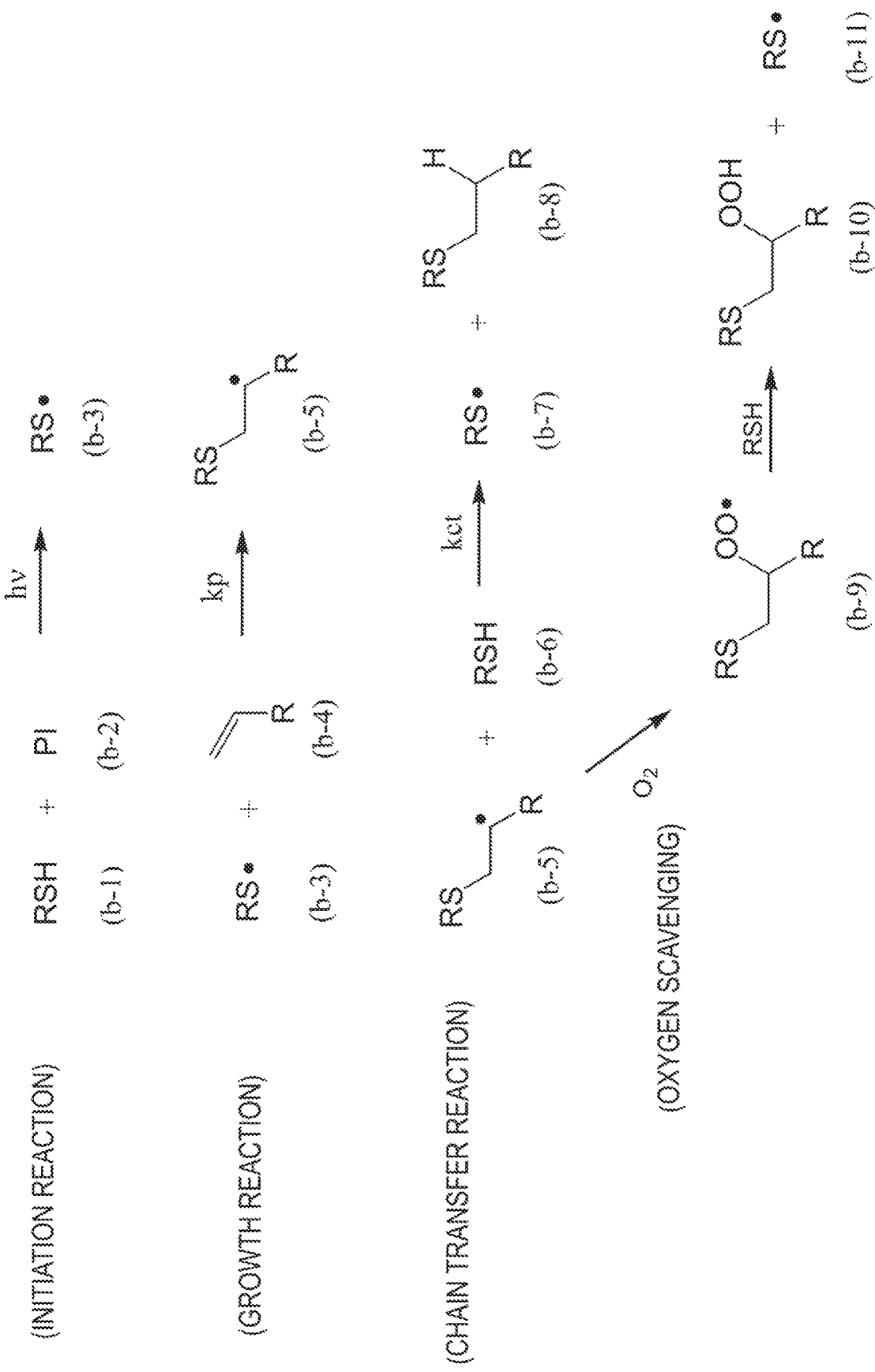
FIG. 11 is an explanatory view indicating an oxygen scavenging mechanism using a reaction between an ene compound and a thiol compound.

FIG. 11 is an explanatory view illustrating an oxygen scavenging mechanism using a reaction between an ene compound and a thiol compound. As indicated in FIG. 11, as an initiation reaction, a thiol compound (b-1) is radicalized by a radical generated from a photo-radical polymerization initiator (b-2), which is one example of the radical polymerization initiator. In a growth reaction, the radicalized compound (b-3) is added to an ene compound (b-4) and becomes a compound (b-5) including a radical. The compound (b-5) reacts with a thiol compound (b-6) in a chain transfer reaction, and thus a compound (b-7) which is the same type of compound as the compound (b-3), and a compound (b-8) are obtained. The compound (b-5) including a radical used in the chain transfer reaction is oxidized if oxygen ($O_2$) exists and becomes a compound (b-9). The compound (b-9) reacts with a thiol compound (RSH), and thus a compound (b-10) and a compound (b-11) including a radical, which is the same type of compound as the compounds (b-3) and (b-7). The oxidization of the ene-thiol compound itself prevents oxygen from entering the liquid crystal layer. Furthermore, the radical polymerization initiator used in the reaction between the ene compound and the thiol compound is also used in the curing of the curable resin composition.

A compound containing at least one thiol group in one molecule is used as the thiol compound. Examples of the thiol compound include aliphatic polythiols such as ethane dithiol, propane dithiol, hexamethylene dithiol, decamethylene dithiol, aromatic polythiols such as tolylene-2,4-dithiol, and xylene dithiol, cyclic sulfide compounds such as 1,4-dithiane-ring-containing polythiol compound represented by the following chemical formula (6), and other thiol compounds such as a polythiol compound containing ester linkage, diglycol dimercaptan, triglycol dimercaptan, tetraglycol dimercaptan, thiodiglycol dimercaptan, thiotriglycol dimercaptan, thiotetraglycol dimercaptan, tris(3-mercaptopropionyloxy)ethyl isocyanurate, tetraethylene glycol bis(3-mercaptopropionate), trimethylol propane tris(3-mercaptopropionate), pentaerythritol tetrakis(3-mercaptopropionate), dipentaerythritol hexakis(3-mercaptopropionate), 4-(mercaptomethyl)-3,6-dithiaoctone-1,8-dithiol, 4,8-bis(mercaptomethyl)-3,6,9-trithiaundecane-1,11-dithiol, 1,3,4, 6-tetramercapto-propionyl-glycoluril, 1,4-bis(3-mercaptobutyryloxy)butane, 1,3,5-tris(3-mercaptobutyryloxyethyl)-1,3,5-triazine-2,4,6(1H, 3H,5H)-trione, trimethylolethane tris (3-mercaptobutylate), trimethylol propane tris(3-mercaptbutylate), pentaerythritol tetrakis(3-mercaptobutylate), and dipentaerythritol hexakis (3-mercaptobutylate). Each of these thiol compounds may be used alone, or may be used together. A thiol compound having two or more thiol groups in one molecule is preferably used as the thiol compound. The thiol compound having two or more thiol groups in one molecule improves efficiency of the initiation reaction, eliminating unreacted thiol compounds. Furthermore, the obtained polymer has a large molecular size, and thus the polymer and the like are less likely to be eluded to the liquid crystal layer. Elution of thiol compounds to the liquid crystal layer does not occur when there is no unreacted thiol compound, leading to an improvement in reliability.

[Chem. 6]

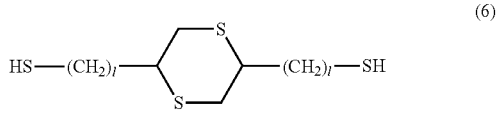

(6)

In the above chemical formula (6), l is an integer of 1 to 5.

A compound having at least one carbon-carbon double bond in one molecule (for example, a vinyl group) is used as the ene compound. Examples of the compound include polyene compounds such as an allyl compound, a methallyl compound, an acrylic compound, a methacryl compound, and a divinylbenzene. Each of these ene compounds may be used alone, or two or more may be used together. The compound preferably has two or more carbon-carbon double bonds in one molecule (vinyl groups, for example). The ene compound having two or more carbon-carbon double bonds in one molecule groups, for example) improves efficiency of the growth reaction, eliminating unreacted ene compounds. Furthermore, this increases a molecular weight of the resulting polymer and thus elution of the polymer, for example, to the liquid crystal layer is less likely to occur. Furthermore, when there are no unreacted ene compound, elution of the ene compound to the liquid crystal layer does not occur, leading to an improvement in reliability. The specific examples of the ene compound are described later.

Examples of the radical polymerization initiator include a visible-light radical polymerization initiator that absorbs visible light to generate radicals and a thermal radical polymerization initiator that absorbs heat to generates radicals. Each of these radical polymerization initiators may be used alone, or two or more may be used together.

As the visible-light polymerization initiator, a compound represented by the following chemical formulas (7-1) and (7-2) are used.

[Chem. 7]

(7-1)

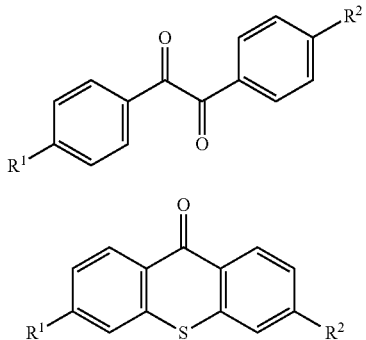

(7-2)

In the chemical formulas (1) and (7-2), and R² may be the same or different from each other and represent a -Sp¹-P¹ group, a hydrogen atom, a halogen, atom, a —CN group, a —NO₂ group, a —NCO group, —NCS group, a —OCN group, a —SCN group, a —SF₅ group, or a C1 to C12 alkyl group, aralkyl group, phenyl group, or biphenyl group. The alkyl group may be linear or branched. At least one of R¹ and R² includes a -Sp¹-P¹ group. P¹ represents an acryloyloxy group, a methacryloyloxy group, a vinyl group, a vinyloxy group, an acryloylamino group, or a methacryloylamino group. Examples of Sp¹ include acryloyloxy group, a methacryloyloxy group, a vinyl group, a vinyloxy group, an acryloylamino group, and a methacryloylamino group. Sp¹ represents a C1 to C6 linear, branched, or cyclic alkylene group or alkyleneoxy group, or a direct bond. If at least one of R¹ and R² represents a C1 to C12 alkyl group, aralkyl group, phenyl group, or biphenyl group, a hydrogen atom in the at least one of R¹ and R² may be substituted by fluorine atom, a chlorine atom, or an -Sp¹-P¹ group. A —CH₂— group in R¹ and R² may be substituted by an —O— group, an —S— group, an —NH— group, a —CO— group, a —COO— group, an —OCO— group, an —O—COO— group, an —OCH₂— group, a —CH₂O— group, an —SCH₂— group, a —CH₂S— group, an —N(CH₃)— group, an —N(C₂H₅)— group, an —N(C₃H₇)— group, an —N(C₄H₉)— group, a —CF₂O— group, an —OCF₂— group, a —CF₂S— group, an —SCF₂— group, an —N(CF₃)— group, a —CH₂CH₂— group, a —CF₂CH₂— group, a —CH₂CF₂— group, a —CF₂CF₂— group, a —CH═CH— group, a —CF═CF— group, a —C≡C— group, a —CH═CH—COO— group, or an —OCO—CH═CH— group if an oxygen atom, a sulfur atom, and a nitrogen atom are not adjacent to each other.

Specific examples of the visible-light radical polymerization initiator include compounds represented by the following chemical formulas (8-1) and (8-2).

[Chem. 8]

(8-1)

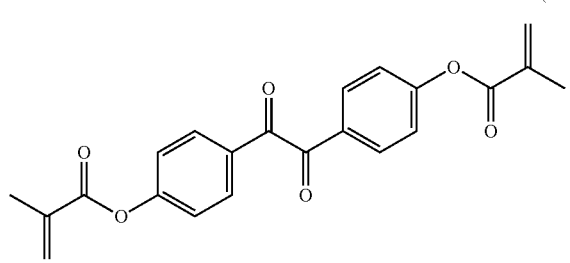

(8-2)

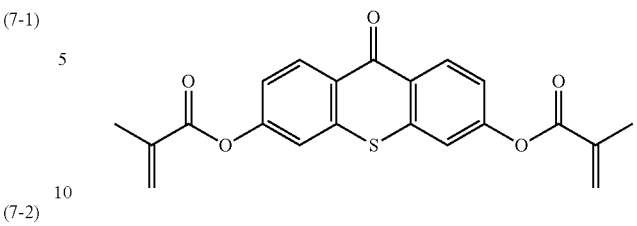

Figure 1:
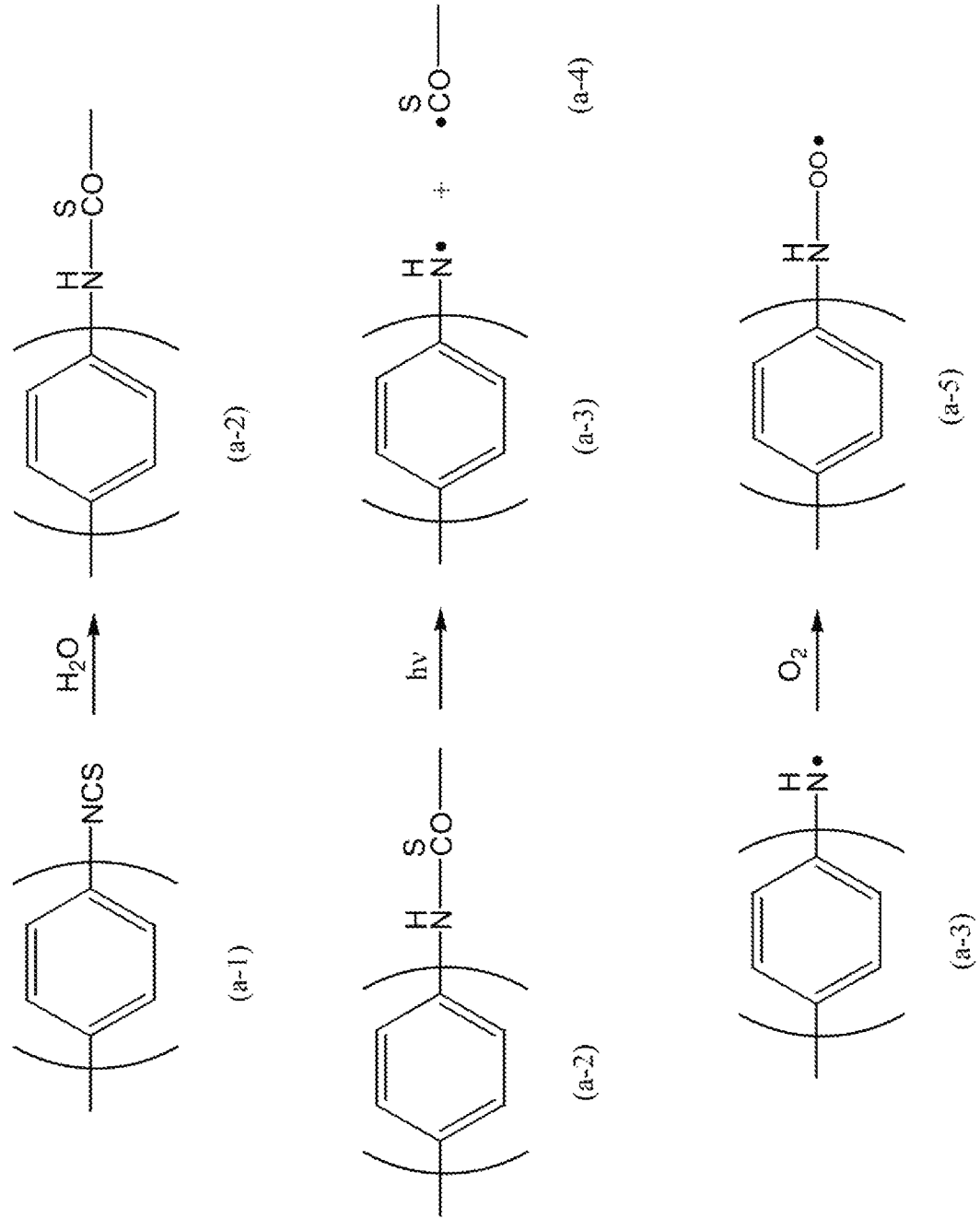
FIG. 1 is an explanatory view illustrating how impurities including stable radicals are generated from a liquid crystal compound containing an isothiocyanate group.

The visible-light radical polymerization initiator is preferably one that absorbs longer-wavelength visible light (visible light of 400 nm or more, preferably 415 nm or more, for example) than the liquid crystal compound containing an isothiocyanate group does to generate radicals, such that photocleavage of the liquid crystal compound containing an isothiocyanate group indicated in FIG. 1 does not proceed.

The thermal radical polymerization initiator may include an azo compound or an organic peroxide, for example. Examples of the azo compound include 2,2'-azobis (2 4-dimethylvaleronitrile) and azobisisobutyronitrile. Examples of the organic peroxide include benzoyl peroxide, ketone peroxide, peroxyketal, hydroperoxide, dialkyl peroxide, peroxyester, diacyl peroxide, and peroxy dicarbonate.

The radical polymerization initiator may be a UV radical polymerization initiator chat absorbs ultraviolet light to generate radicals, for example, as needed.

The composition that forms the sealant S (sealant body Sa) and the composition that forms the sealing portion Sc further include various monomers for adhesion (such as an acrylic monomer and an epoxy monomer) and a filler, for example, addition to the ene compound, as needed. The composition that forms the sealant S (sealing body Sa) and the composition that forms the sealing portion Sc are basically solventless.

(Method of Producing Scanning Antenna)

The method of producing a scanning antenna (method of producing a liquid crystal cell C) includes attaching the TFT board 101 and the slot board 201 to each other with the sealant S therebetween and injecting the liquid crystal layer LC1 into a space between the TFT board 101 and the slot board 201. The liquid crystal material may be injected by a one drop fill method (ODF method) or a vacuum impregnation method. Here, methods of producing the liquid crystal cell C by using a one drop fill method and a vacuum impregnation method are described.

Figure 12:
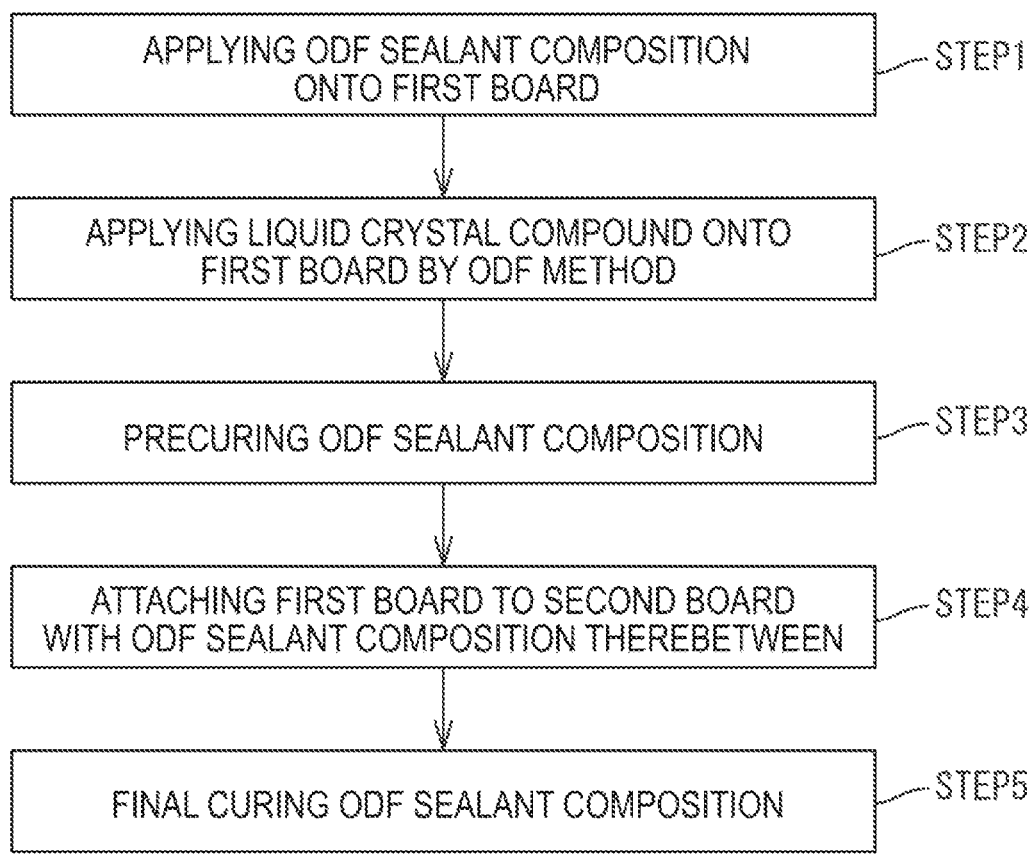
FIG. 12 is a flow diagram indicating a process of producing the liquid crystal cell by using a one drop fill method.

FIG. 12 is a flow diagram indicating a process of producing the liquid crystal cell C by using a one drop fill method. As indicated in FIG. 12, an ODF sealant composition is applied in a frame-like shape onto one of the prepared TFT board 101 and the prepared slot board 201 (herein, TFT board 101) by a seal dispenser (STEP 1). The ODF sealant composition (curable resin composition) includes a photocurable and thermosetting resin and a composition to scavenge oxygen (ene compound, for example). Then, a liquid crystal material (including a liquid crystal compound containing an isothiocyanate group) is applied (drop added) onto the board (TFT board 101) by an ODF method (STEP 2). Then, the ODF sealant composition is irradiated with light (for example, visible light) to precure the ODF sealant composition (STEP 3). Subsequently, the board (TFT board 101) and the other board (slot board 201) are attached to each other with the precured ODF sealant composition therebetween (STEP 4). Then, the ODF sealant composition is heated for final curing such that the TFT board 101 and the slot board 201 are fixed to each other. As described above, the liquid crystal cell C is able to be produced by using the one drop fill method.

In a one drop fill method, oxygen may readily enter a liquid crystal material (liquid crystal layer LC1) through an ODF sealant composition (uncured sealant) after application of the liquid crystal material and before the end of a final curing of the ODF sealant composition. However, the ODF sealant composition in this embodiment includes a composition to scavenge oxygen (ene compound, thiol compound, radical polymerization initiator), and thus outside oxygen is efficiently scavenged by the ODF sealant composition.

Figure 13:
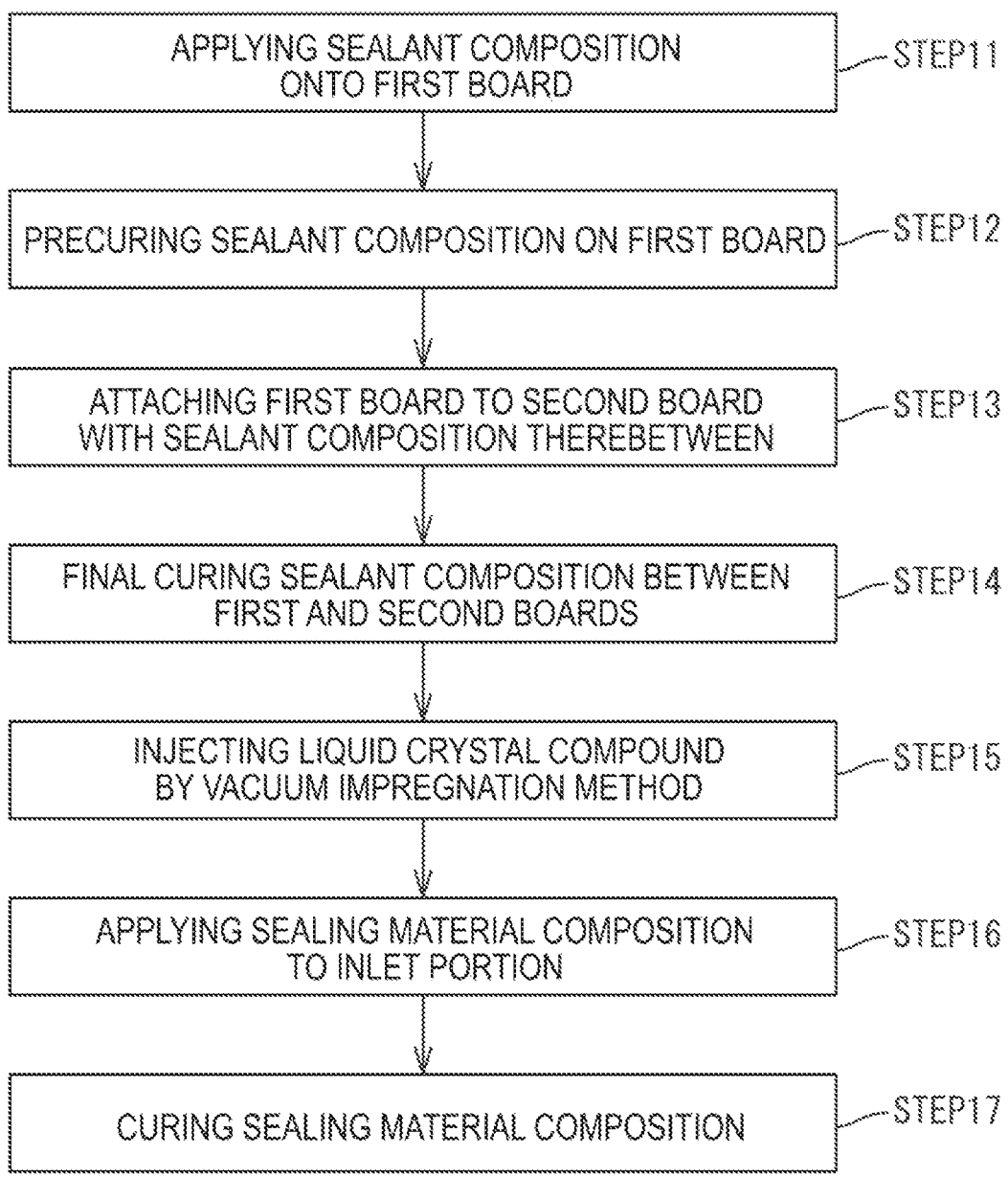
FIG. 13 is a flow diagram indicating a process of producing the liquid crystal cell by using a vacuum impregnation method.

FIG. 13 is a flow diagram indicating a process of producing the liquid crystal cell by using a vacuum impregnation method. As indicated in FIG. 13, first, a sealant composition for a vacuum impregnation method is applied onto one of the prepared TFT board 101 and the prepared slot board 201 (here, TFT board 101) by using a seal plate, for example (STEP 11). In this step, the sealant composition is applied in a predetermined pattern onto the board to form the sealant body Sa and the inlet portion Sb. A portion to be the inlet portion Sb includes a cutout in the frame-shaped sealant composition. The sealant composition contains a thermosetting epoxy resin, for example.

Then, the sealant composition on the board is heated for precuring (STEP 12). Then, the board (TFT board 101) and the other board (slot board 201) are attached to each other with the precured sealant composition therebetween (STEP 13). Then, the sealant composition is heated for final curing (STEP 14). The sealant body Sa and the inlet portion Sb are formed by the final curing of the sealant composition.

Subsequently, under a reduced pressure, the liquid crystal material (including a liquid crystal compound containing an isothiocyanate group) is injected into the liquid crystal cell C through the inlet portion Sb by a vacuum impregnation method (STEP 15). Then, under a normal pressure, the sealing material composition is applied to close the inlet portion Sb (STEP 16). The sealing material composition includes a composition to scavenge oxygen (ene compound, thiol compound, radical polymerization initiator) and an adhesive composition including a curable resin that seals the inlet portion Sb, for example. The sealing material composition is cured by heat or light (visible light), for example, such that the sealing material composition becomes the sealing portion Sc. In this way, the sealant S including the sealing body Sa, the inlet portion Sb, and the sealing portion Sc is formed. As described above, the liquid crystal cell C is able to be produced by using a vacuum impregnation method.

In a vacuum impregnation method, oxygen may readily enter a liquid crystal material (liquid crystal layer LC1) through the inlet portion Sb and the uncured sealing portion Sc after the end of the injection of the liquid crystal material through the inlet portion Sb and before the inlet portion Sb is sealed with the sealing portion Sc. However, the sealing material composition in this embodiment includes a composition to scavenge oxygen (ene compound, thiol compound, radical polymerization initiator), and thus outside oxygen is efficiently scavenged by the sealing material composition.

After the production of the liquid crystal cell C by using the liquid crystal one drop fill method or the vacuum impregnation method, the reflective conductive plate 65 is suitably attached to the cell so as to face an opposite surface of the slot board 201 (second dielectric substrate 51) with a dielectric (air layer) 54 therebetween. The scanning antenna of this embodiment is obtained through the above-described steps.

EXAMPLES

Hereinafter, the present invention is described further in detail based on examples. The present invention is not limited to the examples.

Example 1

(Production of Liquid Crystal Cell for Scanning Antenna)

A TFT board having the same basic configuration as the TFT board 101 included in the liquid crystal cell of the above-described scanning antenna 1000 and a slot board having the same basic configuration as the slot board 201 included in the liquid crystal cell were provided. An alignment film of the TFT board and an alignment film of the slot board were both formed of an alignment agent for horizontal alignment, which will be described later.

The alignment agent includes a polyamic acid represented by the above chemical formula (1) dissolved in an organic solvent. In the chemical formula (1), X is the chemical formula (3-5) Y is the chemical formula (4-10), and Z is not included. The organic solvent was N-Methyl-2-pyrrolidone (NMP).

In the formation of the alignment film on each of the TFT board and the board, first, the alignment agent was applied by a printing method to form a coating film formed of the alignment agent on each of the boards. Then, the coating films on the boards were each heated at 80° C. for two minutes (precuring), and then the coating films were each heated at 210° C. for ten minutes (final curing).

Then, the coating films on the boards were subjected to a rubbing treatment (alignment treatment), and thus alignment films formed of the alignment agent were formed on the TFT board and the slot board.

A thermosetting sealant (trade name "HC-1413FP" available from Mitsui Chemicals, Inc.) was applied in a frame-like shape onto a surface of the TFT board (adjacent to the alignment film) by using a seal plate. The thermosetting sealant was heated at 100° C. for precuring of the thermosetting sealant. Then, the TFT board and the slot board were attached to each other with the thermosetting sealant therebetween and the boards in such a state were heated at 150° C. for 40 minutes for final curing of the thermosetting sealant. In this way, an empty cell not having a liquid crystal material was obtained. The thermosetting sealant forming the empty cell has an inlet portion having a hole through which the outside and the inside to be filled with the liquid crystal material are in communication with each other.

Subsequently, the liquid crystal material including a liquid crystal compound containing an isothiocyanate group represented by the chemical formulas (5-1) and (5-2) was injected into the empty cell through the inlet portion (hole) by a vacuum impregnation method. Then, a UV curable sealing material composition, which will be described later, was coated to close the hole in the inlet portion, and the coated sealing material composition was irradiated with predetermined light (ultraviolet light having a wavelength of 365 nm or more) to form the sealing portion formed of the cured sealing material composition. In this way, the liquid crystal cell of Example 1 in which the inlet portion of the thermosetting sealant is closed with the sealing portion was obtained.

The composition used as the sealing material composition contained 20% by mass of a thiol compound (pentaerythritol tetra(3-mercaptobutyrate) represented by the following chemical formula (9), 30% by mass of an ene compound (dipentaerythritol hexaacrylate) represented by the following chemical formula (10), and 2% by mass of a photopolymerization initiator (trade name "Irgacure 651" 2,2-Dimethoxy-1,2-diphenylethan-1-one available from BASF Ltd.).

[Chem. 9]

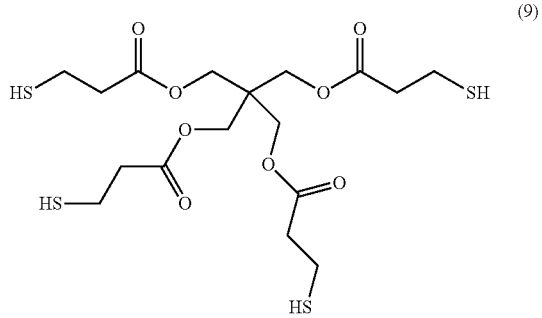

(9)

[Chem. 10]

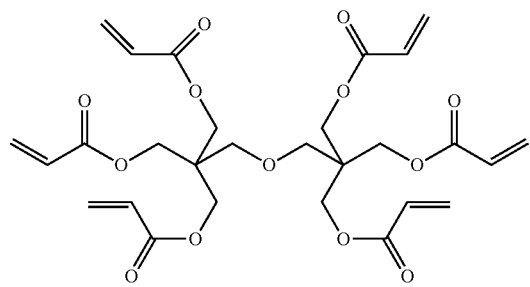

(10)

Example 2

A liquid crystal cell of Example 2 was produced in the same way as that of Example 1 by using the same sealing material composition prepared in Example 1, except that the content of the thiol compound represented by the chemical formula (9) was changed to 40% by mass.

Comparative Example 1

A liquid crystal cell of Comparative Example 1 was produced in the same way as that of Example 1, except that a sealing material composition not including a thiol compound (trade name "TB3026E" available from ThreeBond Co., Ltd.) was used as the sealing material composition.

(Light Irradiation Test at High Temperature)

The following light irradiation test at a high temperature was performed for the liquid crystal cells of Examples 1 and 2 and Comparative Example 1. The liquid cells were left untouched in a thermostatic chamber of 90° C. for 500 hours. The inside of the thermostatic chamber was exposed to light from the fluorescent light, which is located outside the thermostatic chamber, through the window glass. The voltage holding rat (VHR) and the alignment state were determined for each of the liquid crystal cells before and alter being left untouched (at the start of the test and after 500 hours from the start of the test). The voltage holding ratio was determined by using a VHR Measurement System Model 6254 (available from TOYO TECHNICA Inc.) at 1V, 70° C. The results of the measurement are indicated in Table 1. The liquid crystal cell was sandwiched between two cross-nicol polarizers and the alignment state of the liquid crystal cell in such a state was visually checked. The alignment state was evaluated as "fair" when disordering was not found in the alignment state of the liquid crystal compound, and the alignment state was evaluated as "poor" when disordering was found in the alignment state of the liquid crystal compound. The results are indicated in Table 1.

TABLE 1

| | SEALING MATERIAL COMPOSITION | | | EVALUATION | | | |
| --- | --- | --- | --- | --- | --- | --- | --- |
| | | | | 0 HOUR | | 500 HOURS LATER | |
| | THIOL COMPOUND (wt %) | ENE COMPOUND (wt %) | PHOTO-POLY-MERIZATION INITIATOR (wt %) | VHR (%) | ALIGNMENT STATE | VHR (%) | ALIGNMENT STATE |
| EXAMPLE 1 | 20 | 30 | 2 | 83 | FAIR | 42 | FAIR |
| EXAMPLE 2 | 40 | 30 | 2 | 86 | FAIR | 47 | FAIR |
| COMPARATIVE EXAMPLE 1 | 0 | 30 | 2 | 68 | FAIR | 19 | POOR |

As indicated in Table 1, since the liquid crystal cells of Examples 1 and 2 each have a thiol compound represented by the chemical formula (9) in the sealing material composition, the chain transfer reaction in the mechanism of reaction (thiol-ene reaction) between the thiol compound and the ene compound indicated in FIG. 11 proceeded, and the oxygen scavenging reaction probably properly proceeded, too. In other words, in Examples 1 and 2, outside oxygen was effectively prevented from entering the liquid crystal layer (liquid crystal compound) of the liquid crystal cell immediately after the liquid crystal compound containing an isothiocyanate group represented by the chemical formulas (5-1) and (5-2) was injected through the inlet portion to the empty cell, which is surrounded by the sealant, by the vacuum impregnation method and before the inlet portion was sealed with the sealing material. Thus, in Examples 1 and 2, the impurity-forming reaction of the liquid crystal compound containing an isothiocyanate group, which is indicated in FIG. 1, was suppressed, and thus a decrease in VHR after 500 hours was small. In Examples 1 and 2, disordering was not found in the alignment of the liquid crystal compound.

Contrary to this, in the liquid crystal cell of Comparative Example 1, a decrease in VHR after 500 hours was large and disordering was found in the alignment of the liquid crystal compound after 500 hours. In Comparative Example 1, since the sealing material composition did not contain a thiol compound, the thiol-ene reaction did not proceed and outside oxygen reached the liquid crystal layer with high probability. Thus, in the liquid crystal layer of Comparative Example 1, radicals were probably generated in a relatively stable state because the impurity-forming reaction of the liquid crystal compound containing an isothiocyanate group, which is indicated in FIG. 1, proceeded.

Example 3

An empty cell was produced in the same way as in Example 1. The same liquid crystal compound as in Example 1 was injected into the empty cell through the inlet portion (hole) of the sealant by a vacuum impregnation method. Then, a visible-light curing sealing mater al composition, which will be described later, was applied to close the hole in the inlet portion. The sealing material composition was irradiated with light (visible light) of 400 nm or more at 200 mJ/cm$^2$ through a filter that blocks light having a wavelength of 400 nm or less to obtain the sealing portion formed of the cured sealing material composition. In this way, the liquid crystal cell of Example 3 in which the inlet portion of the thermosetting sealant was closed with the sealing portion was obtained.

The sealing material composition used in Example 3 contained 20% by mass of the thiol compound (pentaerythritol tetrakis(3-mercaptobutyrate)) represented by the chemical formula (9), 30% by mass of the ene compound (dipentaerythritol hexaacrylate) represented by the chemical formula (10), and 2% by mass of a benzyl photopolymerization initiator represented by the chemical formula (8) that absorbs visible light to generate radicals.

Example 4

A liquid crystal cell of Example 4 was produced in the same way as that of Example 3 by using the same sealing material composition prepared in Example 3, except that the content of the thiol compound represented by the chemical formula (9) was changed to 40% by mass.

(Light Irradiation Test at High Temperature)

The light irradiation test at high temperature was performed for the liquid crystal cells of Examples 3 and 4 as in Example 1, for example, and VHR and the alignment state were determined for the liquid crystal cells at the start of the test (0 hour) and after 500 hours from the start of the test. The results are indicated in Table 2.

TABLE 2

| | SEALING MATERIAL COMPOSITION | | | EVALUATION | | | |
|---|---|---|---|---|---|---|---|
| | THIOL | ENE | PHOTO-POLY-MERIZATION INITIATOR | 0 HOUR | | 500 HOURS LATER | |
| | COMPOUND (wt %) | COMPOUND (wt %) | (VISIBLE LIGHT) (wt %) | VHR (%) | ALIGNMENT STATE | VHR (%) | ALIGNMENT STATE |
| EXAMPLE 3 | 20 | 30 | 2 | 83 | FAIR | 42 | FAIR |
| EXAMPLE 4 | 40 | 30 | 2 | 86 | FAIR | 47 | FAIR |

In Examples 3 and 4, the sealing material composition that forms the sealing portion included a visible-light absorbing radical polymerization initiator that generates radicals with visible light, and the light of 400 nm or less was blocked by the filter. In Examples 3 and 4, the VHR at the start of the test (0 hour) and the VHR after 500 hours from the start of the test were both high compared with those in Examples 1 and 2. As can be seen from this, in Examples 3 and 4, the visible-light absorbing radical polymerization initiator suppressed the photocleavage reaction indicated in FIG. 1 to the maximum extent possible, leading to an improvement in VHR. In Examples 3 and 4, the alignment state was fair both at the start of the test (0 hour) and after 500 hours from the start of the test.

Example 5

An empty cell was produced in the same way as that in Example 1. The same liquid crystal compound as in Example 1 was injected into the empty cell through the inlet portion (hole) of the sealant by a vacuum impregnation method. Then, a thermosetting sealing material composition, which will be described later, was applied to close the hole in the inlet portion. The sealing material composition was heated at 70° C. for 30 minutes to obtain the sealing portion formed of the cured sealing material composition. In this way, the liquid crystal cell of Example 5 in which the inlet portion of the thermosetting sealant was closed with the sealing portion was obtained.

The sealing material composition used in Example 5 contained 20% by mass of the thiol compound (pentaerythritol tetrakis(3-mercaptobutyrate)) represented by the chemical formula (9), 30% by mass of the ene compound (dipentaerythritol hexaacrylate) represented by the chemical formula (10), and 2% by mass of an azo thermal polymerization initiator (2,2'-azobis(2,4-dimethylvaleronitrile)) represented by the following chemical formula (11).

[Chem. 11]

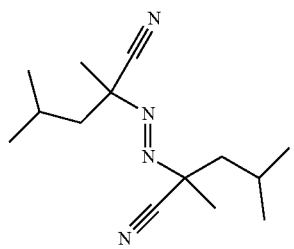

(11)

[Chem. 12]

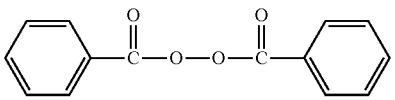

(12)

Example 8

A liquid crystal cell of Example 8 was produced in the same way as that of Example 7 by using the same thermosetting sealing material composition prepared in Example 7, except that the content of the thiol compound represented by the chemical formula (9) was changed to 40% by mass.

(Light Irradiation Test at High Temperature)

The light irradiation test at a high temperature was performed for the liquid crystal cells of Examples 5 to 8, and VHR and the alignment state were determined for the liquid crystal cell at the start of the test (0 hour) and after 500 hours from the start of the test, as in Example 1, for example. The results are indicated in Table 3.

TABLE 3

| | SEALING MATERIAL COMPOSITION | | | | EVALUATION | | | |
| | | | THERMAL POLY- | | | | | |
| | | | MERIZATION INITIATOR | | 0 HOUR | | 500 HOURS LATER | |
| | THIOL | ENE | | | | | | |
| | COM- | COM- | (wt %) | | | ALIGN- | | ALIGN- |
| | POUND (wt %) | POUND (wt %) | FORMULA (11) | FORMULA (12) | VHR (%) | MENT STATE | VHR (%) | MENT STATE |
|---|---|---|---|---|---|---|---|---|
| EXAMPLE 5 | 20 | 30 | 2 | 0 | 53 | FAIR | 44 | FAIR |
| EXAMPLE 6 | 40 | 30 | 2 | 0 | 58 | FAIR | 47 | FAIR |
| EXAMPLE 7 | 20 | 30 | 0 | 2 | 49 | FAIR | 43 | FAIR |
| EXAMPLE 8 | 40 | 30 | 0 | 2 | 54 | FAIR | 45 | FAIR |

Example 6

A liquid crystal cell of Example 6 was produced in the same way as that of Example 5 by using the same thermosetting sealing material composition prepared in Example 5, except that the content of the thiol compound represented by the chemical formula (9) was changed to 40% by mass.

Example 7

A liquid crystal cell of Example 7 was produced in the same way as that of Example 5 by using the same thermosetting sealing material composition prepared in Example 5, except that 2% by mass of benzoyl peroxide represented by the chemical formula (12) was used instead of the azo thermal polymerization initiator.

Example 9

A TFT board and a slot board each having an alignment film thereon were produced as in Example 1.

A photocurable and thermosetting ODF sealant, which will be described later, was applied in a frame-like shape onto a surface (adjacent to the alignment film) of the TFT board by using a seal dispenser. Then, the liquid crystal compound containing an isothiocyanate group represented by the chemical formulas (5-1) and (5-2) was drop added by an ODF method on the inner side of the frame. Then, a mask is disposed on the TFT board over the formation area of the liquid crystal layer and not over the sealant. In such a state, the sealant was irradiated with ultraviolet light (center wavelength of 365 nm) to precure the sealant. Then, the TFT board and the slot board were attached to each other with the sealant therebetween. The boards in such a state were heated at 160° C. for 40 minutes for final curing of the sealant. In this way, the liquid crystal cell of Example 9 was obtained.

The composition used as the ODF sealant contained 15% by mass of a thiol compound (l=3) represented by the chemical formula (6), 40% by mass of an ene compound (triallyl isocyanurate) represented by the following chemical formula (13), 3% by mass of a photopolymerization initiator (trade name "Irgacure OXE01"), 10% by mass of a (meth) acrylic monomer, 6% by mass of an epoxy monomer, 4% by mass of an epoxy monomer curing agent, 2% by mass of a silane coupling agent, and 20% by mass of an inorganic fillet.

[Chem.13]

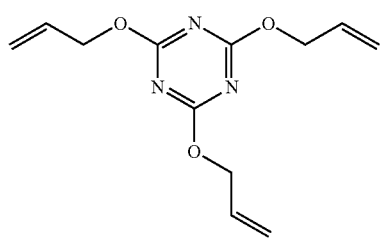

(13)

Example 10

A liquid crystal cell of Example 10 was produced in the same way as that of Example 9 by using the same ODF sealant prepared in Example 9, except that the content of the thiol compound represented by the chemical formula (6) was changed to 30% by mass.

Comparative Example 2

A liquid crystal cell of Comparative Example 4-2 was produced in the same way as that of Example 9 by using the same ODF sealant (composition) prepared in Example 9, except that the thiol compound represented by the chemical formula (6) was not contained.

(Light Irradiation Test at High Temperature)

The light irradiation test at a high temperature was performed for the liquid crystal cells of Examples 9 and 10 and Comparative Example 2, and VHR and the alignment state were determined for the liquid crystal cells at the start of the test (0 hour) and after 500 hours from the start of the test, as in Example 1, for example. The results are indicated in Table 4.

composition, the chain transfer reaction in the mechanism of the thiol-ene reaction indicated in FIG. 11 proceeded, and the oxygen scavenging reaction probably properly proceeded, too. In other words, in Examples 9 and 10, outside oxygen was effectively prevented from entering the liquid crystal layer (liquid crystal compound) of the liquid crystal cell immediately after the liquid crystal compound containing an isothiocyanate group represented by the chemical formulas (5-1) and (5-2) was drop added by an ODF method on the inner side of the frame-shaped ODF sealant and before the ODF sealant was fully cured (final curing). Thus, in Examples 9 and 10, the impurity-forming reaction of the liquid crystal compound containing an isothiocyanate group indicated in FIG. 1 was suppressed, and thus a decrease in VHR after 500 hours was small. In Examples 9 and 10, disordering was not found in the alignment of the liquid crystal compound.

Contrary to this, in the liquid crystal cell of Comparative Example 2, the VHR after 500 hours largely decreased and disordering was found in the alignment of the liquid crystal compound after 500 hours. Since Comparative Example 2 did not include the thiol compound in the ODF sealant composition, the thiol-ene reaction did not proceed, and outside oxygen reached the liquid crystal layer at a high probability. Thus, in the liquid crystal layer of Comparative Example 2, radicals were probably generated in a relatively stable state because the impurity-forming reaction of the liquid crystal compound containing an isothiocyanate group, which is indicated in FIG. 1, proceeded.

Example 11

A TFT board and a slot board each having an alignment film thereon were produced as in Example 1.

A photocurable and thermosetting ODF sealant was applied in a frame-like shape onto a surface (adjacent to the alignment film) of the TFT board by using a seal dispenser. Then, the liquid crystal compound containing an isothiocyanate group represented by the chemical formulas (5-1) and (5-2) was drop added by the ODF method on the inner side of the frame. Then, a mask is disposed on the TFT board over the formation area of the liquid crystal layer and not over the sealant. In such a state, the sealant was irradiated with light (visible light) of 400 nm or more at 200 mJ/cm² through a filter that blocks light having a wavelength of 400 nm or less to precure the sealing material. Then, the TFT board and the slot board were attached to each other with the

TABLE 4

| | ODF SEALANT COMPOSITION | | | EVALUATION | | | |
|---|---|---|---|---|---|---|---|
| | THIOL COMPOUND (wt %) | ENE COMPOUND (wt %) | PHOTO-POLY-MERIZATION INITIATOR (wt %) | 0 HOUR | | 500 HOURS LATER | |
| | | | | VHR (%) | ALIGNMENT STATE | VHR (%) | ALIGNMENT STATE |
| EXAMPLE 9 | 15 | 30 | 3 | 63 | FAIR | 37 | FAIR |
| EXAMPLE 10 | 30 | 30 | 3 | 69 | FAIR | 40 | FAIR |
| COMPARATIVE EXAMPLE 2 | 0 | 30 | 3 | 42 | FAIR | 16 | POOR |

As indicated in Table 4, since the liquid crystal cells of Examples 9 and 10 contained the thiol compound represented by the chemical formula (6) in the ODF sealant sealant therebetween. The boards in such a state were heated at 160° C. for 40 minutes for final curing of the sealant. In this way, the liquid crystal cell of Example 11 was obtained.

The composition used as the ODF sealant contained 30% by mass of a thiol compound (l=1) represented by the chemical formula (6), 40% by mass of an ene compound (triallyl isocyanurate) represented the chemical formula (13), 3% by mass of a thioxanthone polymerization initiator represented by the chemical formula (8-2) that absorbs visible light to generate radicals, 10% by mass of a (meth) acrylic monomer, 6% by mass of an epoxy monomer, 4% by mass of an epoxy monomer curing agent, 2% by mass of a silane coupling agent, and 5% by mass of an inorganic filler.

Example 12

A liquid crystal cell of Example 12 was produced in the same way as that of Example 11 by using the same ODF sealant prepared in Example 11, except that 30% by mass of the thiol compound (l=3) represented by the chemical formula (6) was used as the thiol compound.

Example 13

A liquid crystal cell of Example 13 was produced in the same way as that of Example 11 by using the same ODF sealant prepared in Example 11, except that 30% by mass of the thiol compound (l=5) represented by the chemical formula (6) was used as the thiol compound.

(Light Irradiation Test at High Temperature)

The light irradiation test at a high temperature was performed for the liquid crystal cells of Examples 11 to 13, and VHR and the alignment state were determined for the liquid crystal cells at the start of the test (0 hour) and after 500 hours from the start of the test, as in Example 1, for example. The results are indicated in Table 5.

TABLE 5

| | ODF SEALANT COMPOSITION | | | | | EVALUATION | | | |
|---|---|---|---|---|---|---|---|---|---|
| | THIOL | | | ENE | PHOTO-POLY- | 0 HOUR | | 500 HOURS LATER | |
| | COMPOUND (wt %) | | | COM-POUND | MERIZATION INITIATOR | | ALIGN- | | ALIGN- |
| | l = 1 | l = 3 | l = 5 | (wt %) | (wt %) | VHR (%) | MENT STATE | VHR (%) | MENT STATE |
| EXAMPLE 11 | 30 | | | 30 | 3 | 76 | FAIR | 42 | FAIR |
| EXAMPLE 12 | | 30 | | 30 | 3 | 72 | FAIR | 49 | FAIR |
| EXAMPLE 13 | | | 30 | 30 | 3 | 72 | FAIR | 49 | FAIR |

In Examples 11 to 13, the ODF sealant contained the visible-light absorbing radical polymerization initiator that generates radicals with visible light, and light of 400 nm or less was blocked by the filter. In Examples 11 to 13, the VHR at the start of the test (0 hour) and the VHR after 500 hours from the start of the test were both high. As can be seen from this, in Examples 11 to 13, the visible-light absorbing radical polymerization initiator suppressed the photocleavage reaction indicated in FIG. 1 to the maximum extent possible, leading to an improvement in VHR. In Examples 11 to 13, the alignment state was fair both at the start of the test (0 hour) and after 500 hours from the start of the test.

EXPLANATION OF SYMBOLS

1 . . . dielectric substrate (first dielectric substrate), 3 . . . gate electrode, 4 . . . gate insulating layer, 5 . . . semiconductor layer, 6D . . . drain contact layer, 6S . . . source contact layer, 7D . . . drain electrode, 7S . . . source electrode, 10 . . . TFT, 11 . . . first insulating layer, 15 . . . patch electrode, 17 . . . second insulating layer, 51 . . . dielectric substrate (second dielectric substrate), 55 . . . slot electrode, 55L . . . lower layer, 55M . . . main layer, 55U . . . upper layer, 57 . . . slot, 57U . . . slot electrode unit, 58 . . . third electrode, 70 . . . power feeder, 72 . . . power feed pin, 80 . . . sealant, 81 . . . liquid crystal fill port, 82 . . . sealing portion, 101 . . . TFT board, 201 . . . slot board, 1000 . . . scanning antenna, U . . . antenna unit (antenna unit region), CH1 . . . contact hole, LC . . . liquid crystal layer, C . . . liquid crystal cell, GD . . . gate driver, GL . . . gate bus line, GT . . . gate terminal, SD . . . source driver, SL . . . source bus line, ST . . . source terminal, PT . . . transfer terminal, R1 . . . transmission/reception region, R2 . . . non-transmission/reception region, Rs . . . seal region, S . . . . sealant, Sa . . . sealant body, Sb . . . inlet portion, Sc . . . sealing portion, OM, OM1, OM2 . . . alignment film, C . . . liquid crystal cell

The invention claimed is:

1. A liquid crystal cell for a scanning antenna, comprising:
a thin film transistor (TFT) board including a first dielectric substrate, TFTs supported by the first dielectric substrate, and patch electrodes electrically connected to the TFTs;
a slot board including a second dielectric substrate and a slot electrode having slots and supported by the second dielectric substrate; and
a liquid crystal layer between the TFT board and the slot board, the TFT board and the slot board being positioned with the patch electrodes and the slot electrode facing each other in such a manner that the patch electrodes are located relative to the corresponding slots;
a sealant disposed between the TFT board and the slot board and surrounding the liquid crystal layer, wherein
the liquid crystal layer includes a liquid crystal compound containing an isothiocyanate group, and
the sealant includes an ene-thiol compound in which an ene compound and a thiol compound are bonded by using a radical.

2. The liquid crystal cell for the scanning antenna according to claim 1, wherein the liquid crystal compound containing the isothiocyanate group has a structure represented by any one of the following chemical formulas (1-1) and (1-2):

[Chem. 1]

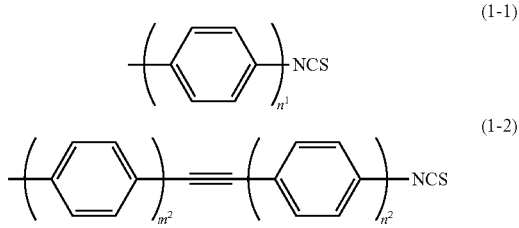

(in the chemical formulas (1-1) and (1-2), each of $n^1$, $m^2$, and $n^2$ is an integer of 1 to 5, and H in a phenylene group may be substituted by F or CO.

3. The liquid crystal cell for the scanning antenna according to claim 1, wherein the thiol compound has two or more thiol groups in one molecule.

4. The liquid crystal cell for the scanning antenna according to claim 1, wherein the ene compound has two or more carbon-carbon double bonds in one molecule.

5. The liquid crystal cell for the scanning antenna according to claim 1, wherein the sealant includes a sealant body that surrounds the liquid crystal layer between the TFT board and the slot board and includes an inlet portion having a hole through which the liquid crystal layer and an outside are in communication with each other and a sealing portion that seals the hole in the inlet portion, and
the sealant body and/or the sealing portion includes the ene-thiol compound.

6. The liquid crystal cell for the scanning antenna according to claim 1, wherein the TFT board and/or the slot board includes an alignment film formed of a polyimide resin at a side adjacent to the liquid crystal layer.

7. A method of producing a liquid crystal cell for a scanning antenna, comprising:
applying a photocurable and/or thermosetting one drop filling (ODF) sealant composition including an ene compound, a thiol compound, and a radical polymerization initiator in a frame-like shape onto one of a thin film transistor (TFT) board and a slot board, the TFT board including a first dielectric substrate, TFTs supported by the first dielectric substrate, and patch electrodes electrically connected to the TFTs, the slot board including a second dielectric substrate and a slot electrode having slots and supported by the second dielectric substrate;
applying a liquid crystal material including a liquid crystal compound containing an isothiocyanate group onto the one of the TFT board and the slot board by an ODF method on an inner side of the frame-like shaped ODF sealant composition;
allowing the ODF sealant composition on the one of the TFT board and the slot board to be subjected to precuring;
attaching the TFT board and the slot board to each other with the ODF sealant composition therebetween; and
allowing the ODF sealant composition to be subjected to final curing.

8. The method of producing the liquid crystal cell for the scanning antenna according to claim 7, wherein the radical polymerization initiator is one of a photo-radical polymerization initiator that generates radicals by using light and a thermal-radical polymerization initiator that generates radicals by using heat.

9. The method of producing the liquid crystal cell for the scanning antenna according to claim 7, wherein the radical polymerization initiator includes a compound having a benzyl group or a thioxanthone group.

10. The method of producing the liquid crystal cell for the scanning antenna according to claim 7, wherein the radical polymerization initiator includes an azo compound.

11. The method of producing the liquid crystal cell for the scanning antenna according to claim 7, wherein the radical polymerization initiator includes an organic peroxide.

12. The method of producing the liquid crystal cell for the scanning antenna according to claim 7, wherein the thiol compound has two or more thiol groups in one molecule.

13. The method of producing the liquid crystal cell for the scanning antenna according to claim 7, wherein the ene compound has two or more carbon-carbon double bonds in one molecule.

14. The method of producing the liquid crystal cell for the scanning antenna according to claim 7, wherein the TFT board and/or the slot board includes an alignment film formed of a polyimide resin on a side adjacent to the liquid crystal layer.

15. A method of producing a liquid crystal cell for a scanning antenna, comprising:
applying a photocurable and/or thermosetting sealant composition in a frame-like shape with a cutout onto one of a thin film transistor (TFT) board and a slot board, the TFT board including a first dielectric substrate, TFTs supported by the first dielectric substrate, and patch electrodes electrically connected to the TFTs, the slot board including a second dielectric substrate and a slot electrode having slots and supported by the second dielectric substrate;
allowing the sealant composition on the one of the TFT board and the slot board to be subjected to precuring;
attaching the TFT board and the slot board to each other with the sealant composition therebetween;
allowing the sealant composition to be subjected to final curing;
injecting a liquid crystal material including a liquid crystal compound containing an isothiocyanate group by a vacuum impregnation method through an inlet portion including the cutout in the final cured sealant composition;
applying a photocurable and/or thermosetting sealing material composition including an ene compound, a thiol compound, and a radical polymerization initiator to close the inlet portion; and
curing the sealing material composition to form a sealing portion.

* * * * *